US006396629B1

(12) United States Patent
Cao

(10) Patent No.: US 6,396,629 B1
(45) Date of Patent: May 28, 2002

(54) MULTI-FUNCTIONAL OPTICAL DEVICE UTILIZING MULTIPLE BIREFRINGENT PLATES AND A NON-LINEAR INTERFEROMETER

(75) Inventor: Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/645,232

(22) Filed: Aug. 24, 2000

(51) Int. Cl.[7] .......................... G02B 5/30; G02B 27/28; H04J 14/02; H04J 14/06

(52) U.S. Cl. .................. 359/484; 359/122; 359/124; 359/127; 359/494; 359/497; 359/498; 359/900; 385/11; 385/24

(58) Field of Search .................. 359/122, 124, 359/127, 484, 494, 495, 496, 497, 498, 900; 385/11, 24

(56) References Cited

U.S. PATENT DOCUMENTS

| | | | | |
|---|---|---|---|---|
| 4,756,606 A | * | 7/1988 | Jewell et al. | 356/519 |
| 5,076,672 A | * | 12/1991 | Tsuda et al. | 359/244 |
| 5,111,321 A | * | 5/1992 | Patel | 349/198 |
| 5,231,529 A | * | 7/1993 | Kaede | 359/124 |
| 5,867,291 A | * | 2/1999 | Wu et al. | 359/124 |
| 6,005,995 A | * | 12/1999 | Chen et al. | 385/24 |
| 6,063,393 A | * | 12/2000 | Wu et al. | 359/127 |
| 6,166,838 A | * | 12/2000 | Liu et al. | 359/122 |
| 6,208,442 B1 | * | 3/2001 | Liu et al. | 359/127 |
| 6,252,711 B1 | * | 6/2001 | Damask et al. | 359/498 |
| 6,301,046 B1 | * | 10/2001 | Tai et al. | 359/498 |

FOREIGN PATENT DOCUMENTS

| | | | |
|---|---|---|---|
| JP | 63-197130 | * | 8/1988 |
| JP | 06-130339 A | * | 5/1994 |

OTHER PUBLICATIONS

J. S. Patel., "Tunable Polarization Diversity Liquid–Crystal Wavelength Filter", IEEE Photonics Techn. Lett., vol. 3, No. 8, Aug. 1991, pp. 739–740.*

M. W. Maeda, et al., "Electronically Tunable Liquid–Crystal–Etalon Filter for High–Density WDM Systems", IEEE Photonics Techn. Lett., vol. 2, No. 11, Nov. 1990, pp. 820–822.*

J. H. Williamson, "Simple Multiple–Pass Birefringent Filters", J. Optical Soc. America, vol. 61, No. 6, Jun. 1971, pp. 767–769.*

J. Katzenstein, "New Type of Birefringent Filter", J. Optical Soc. America, vol. 58, No. 10, Oct. 1968, pp. 1348–1355.*

* cited by examiner

Primary Examiner—Cassandra Spyrou
Assistant Examiner—John Juba, Jr.
(74) Attorney, Agent, or Firm—Sawyer Law Group LLP

(57) ABSTRACT

The present invention provides a multi-functional optical device. The optical device includes: a first birefringent plate; a first set of optical rotators optically coupled to the first birefringent plate, the first set of optical rotators comprising a first non-reciprocal optical rotator (NRR) and a first reciprocal optical rotator (RR); a second birefringent plate optically coupled to the first set of optical rotators at a side opposite to the first birefringent plate; and a first non-linear interferometer (NLI) optically coupled to the second birefringent plate at a side opposite to the first set of optical rotators. Provision of additional reflectors and/or optical ports leads to additional optical isolator and optical circulator functionality. Provision of additional non-linear interferometers and/or optical ports leads to additional comb filtering and or two-stage channel separation capabilities. The optical device in accordance with the present provides greater ease in alignment and functional versatility than prior-art channel separators.

33 Claims, 29 Drawing Sheets

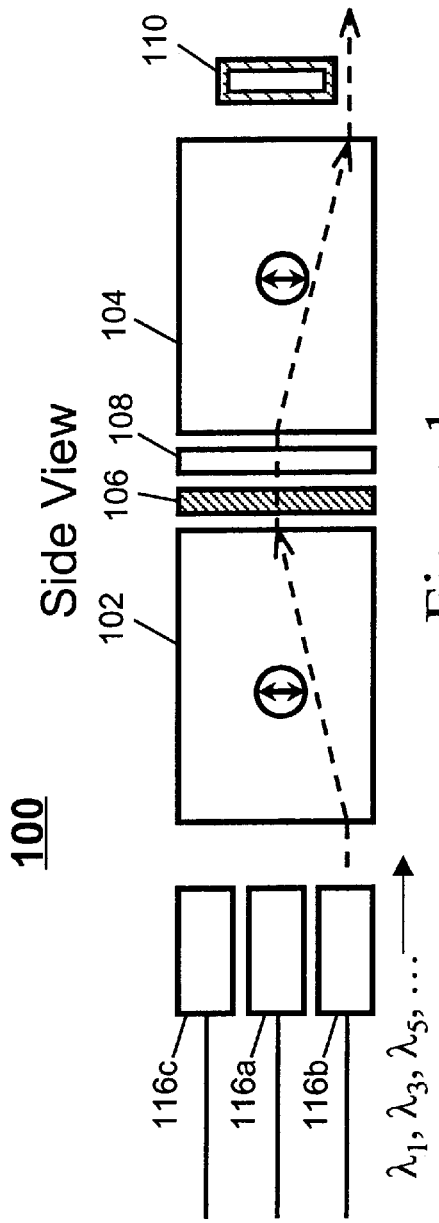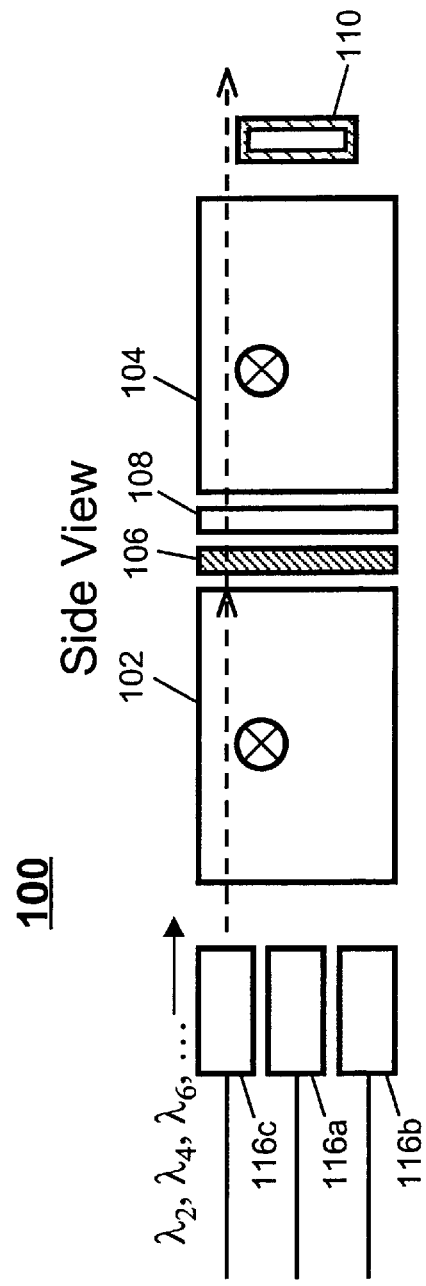

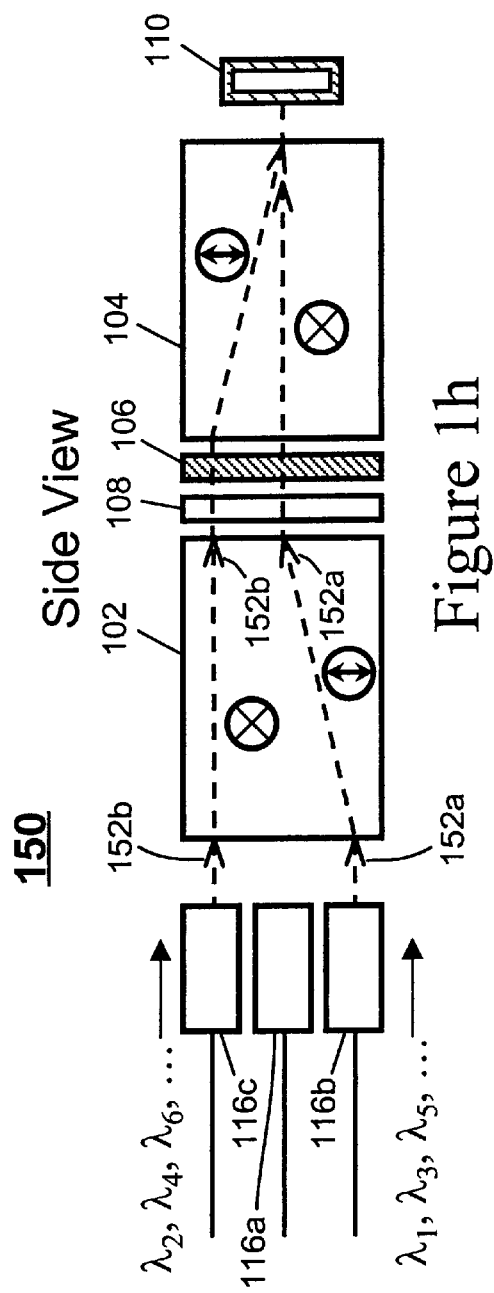
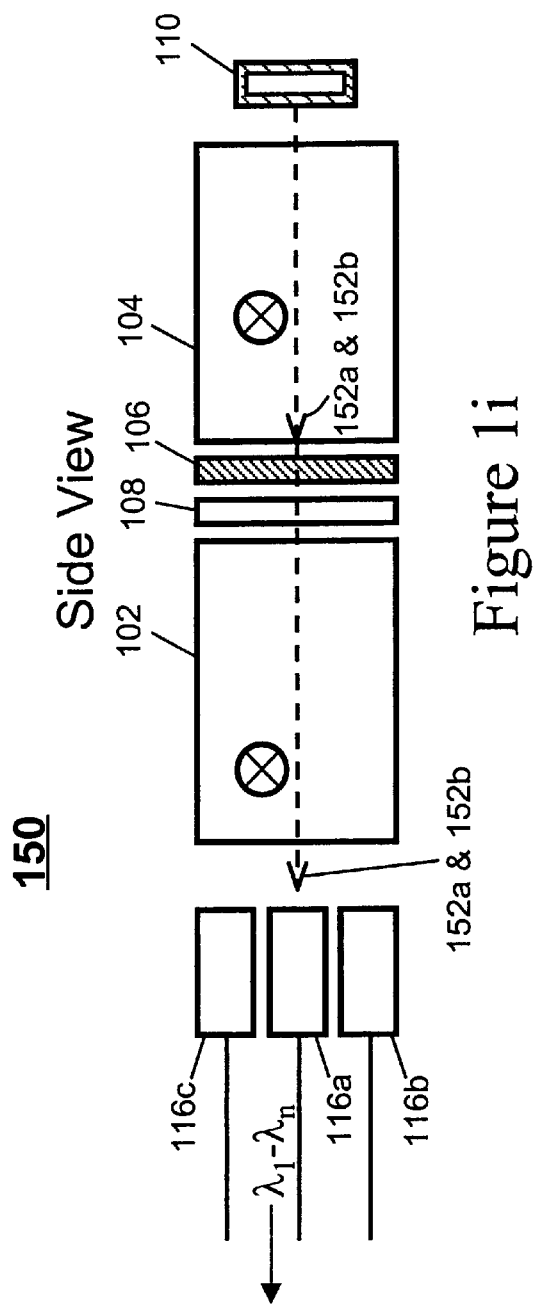

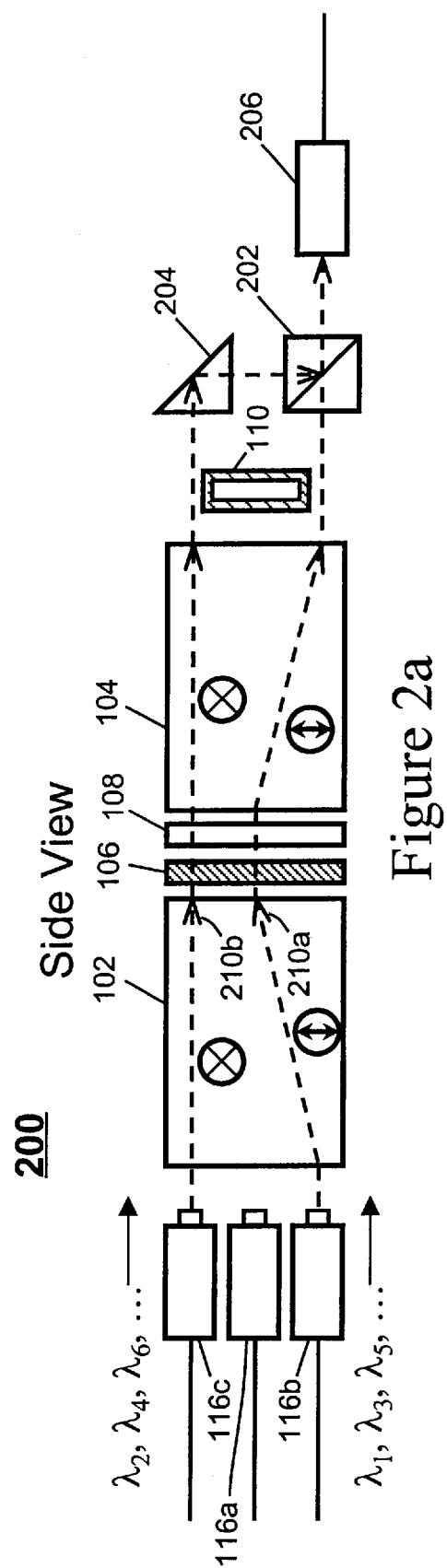

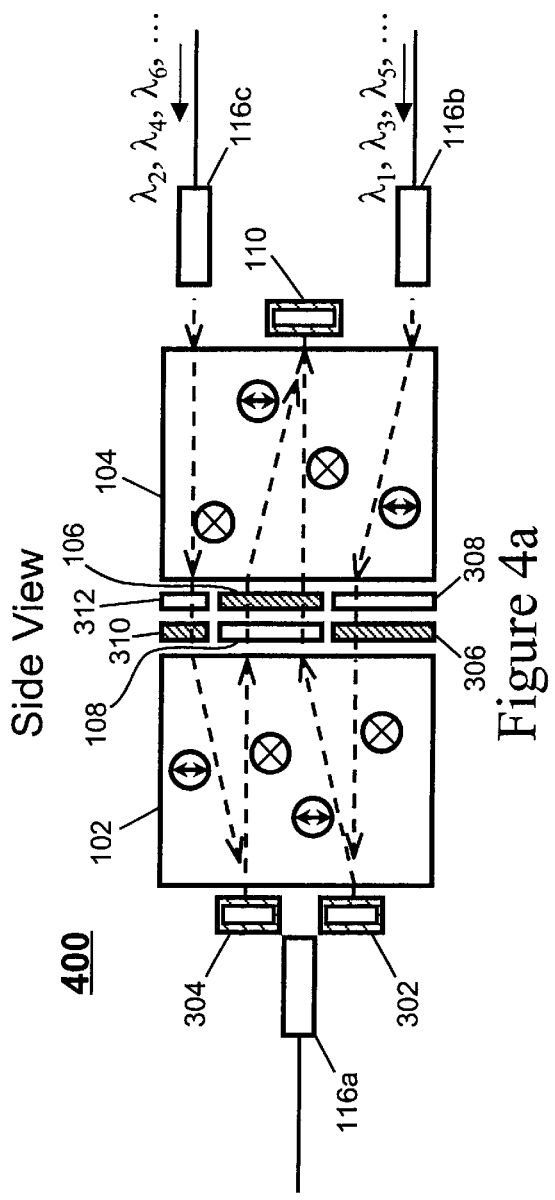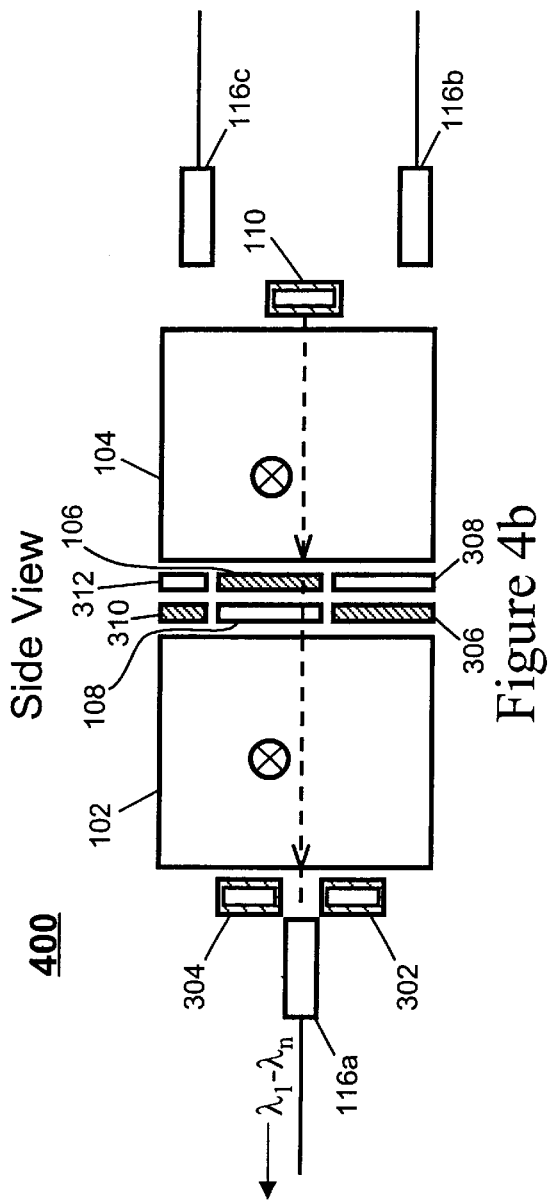

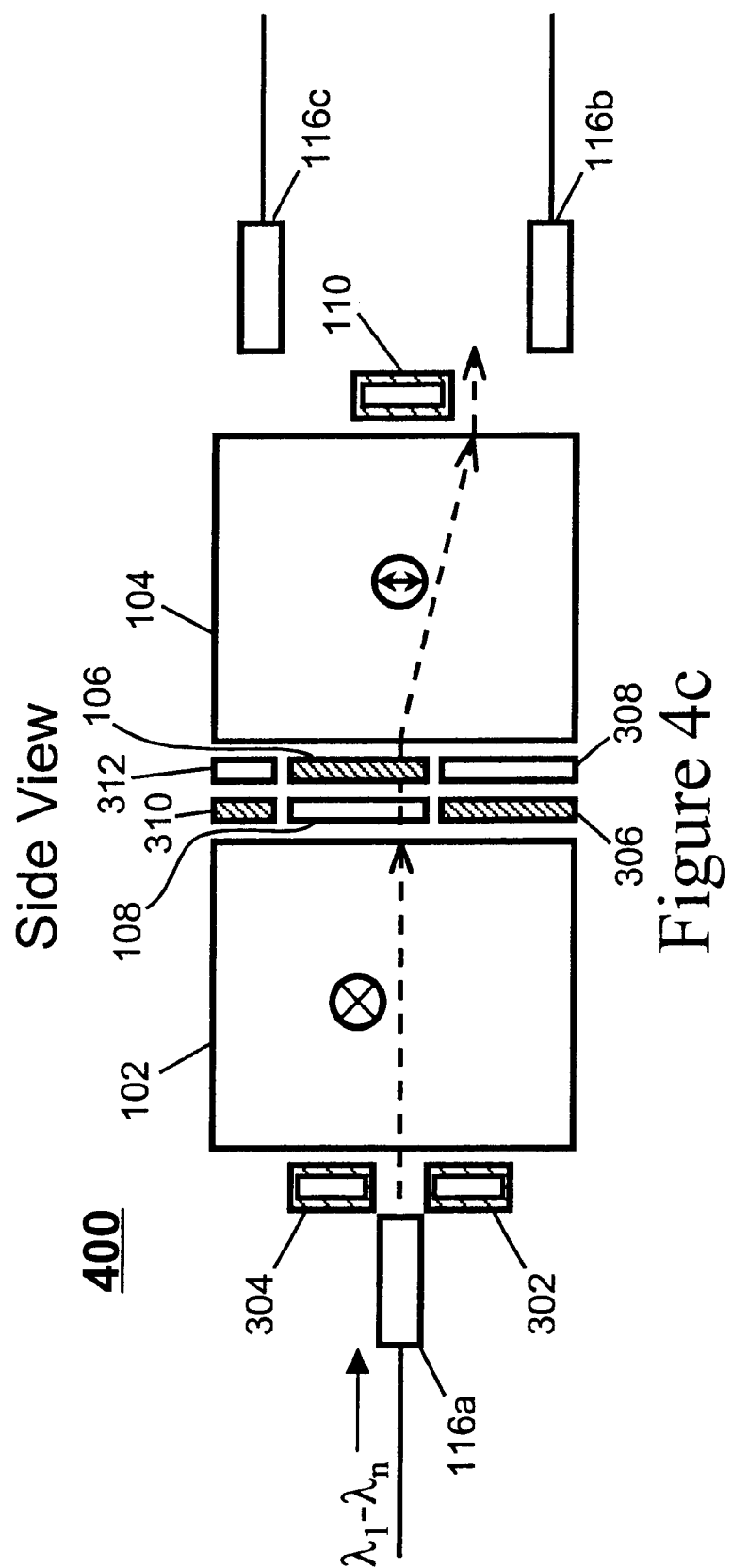

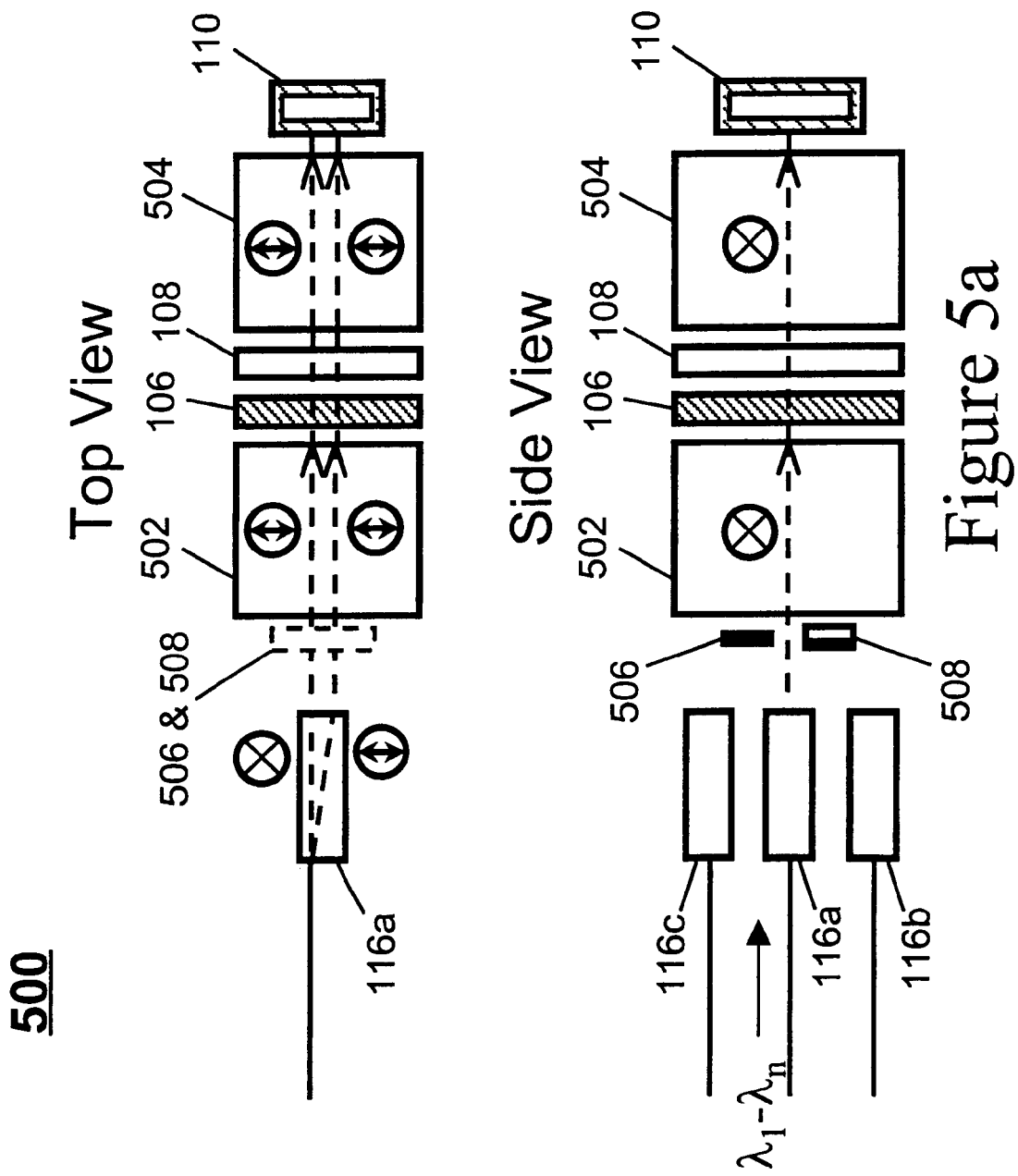

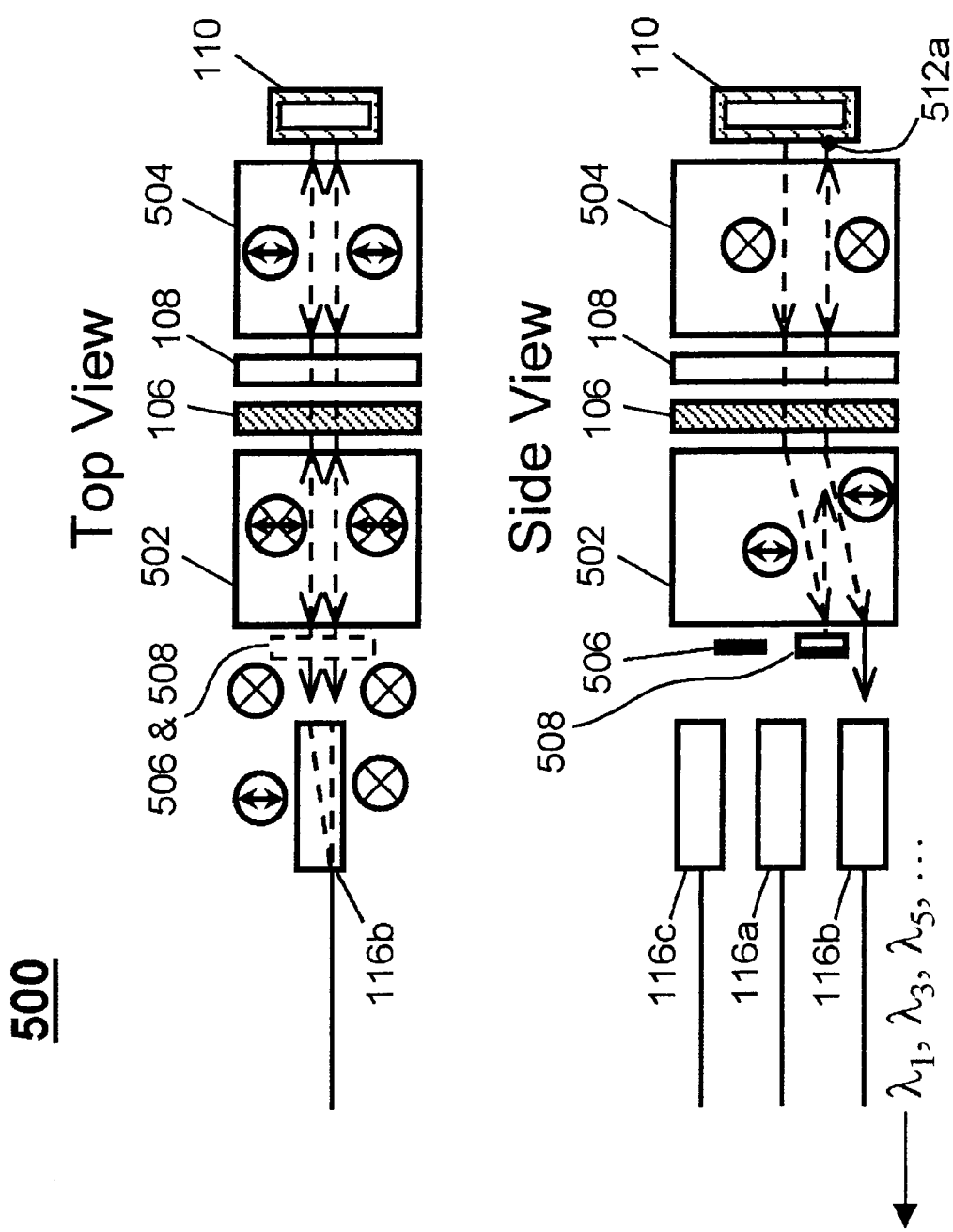

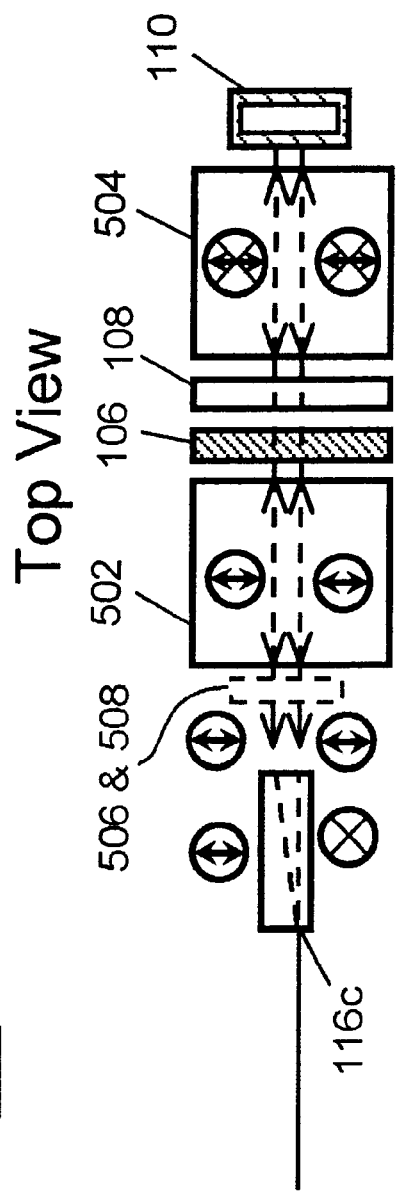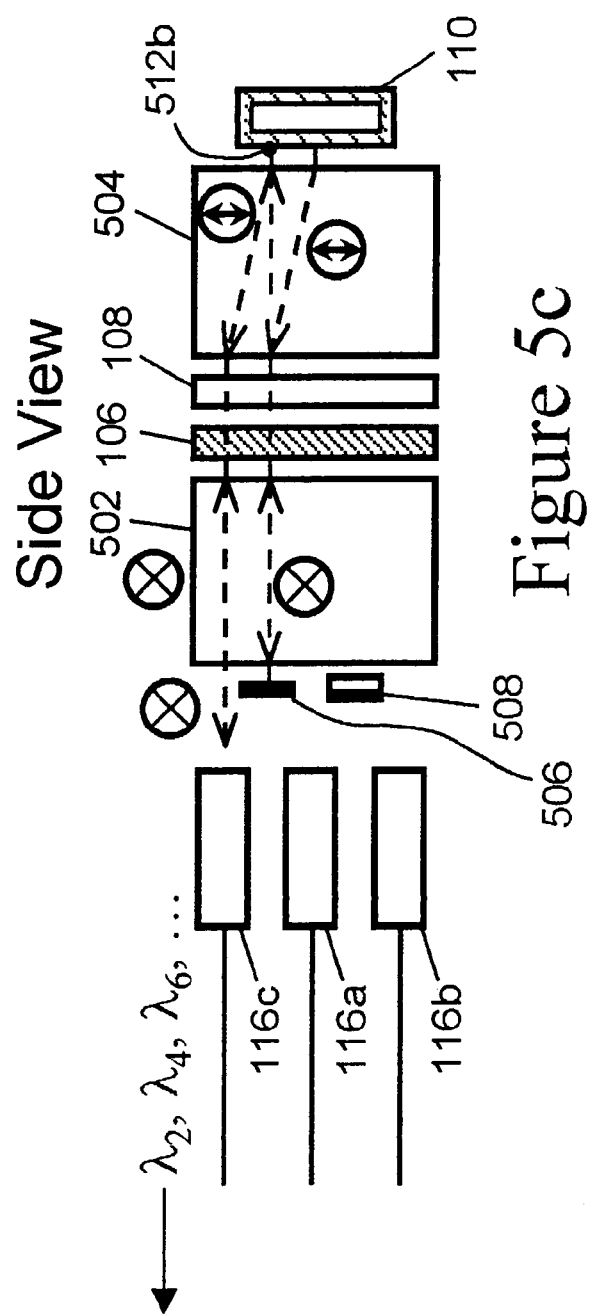
Figure 5c

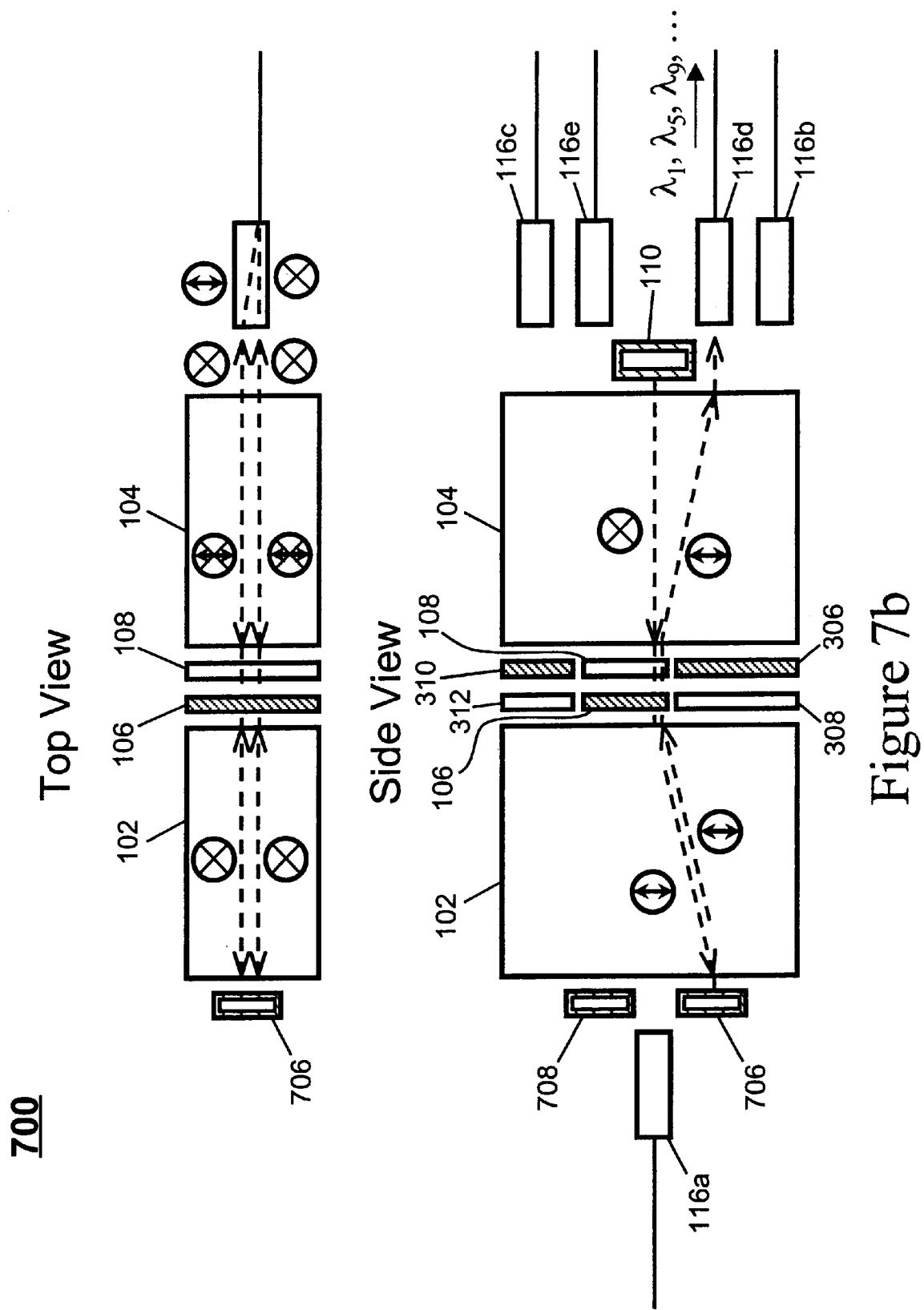

500 # MULTI-FUNCTIONAL OPTICAL DEVICE UTILIZING MULTIPLE BIREFRINGENT PLATES AND A NON-LINEAR INTERFEROMETER

FIELD OF THE INVENTION

The present invention relates to fiber optic networks, and more particularly to wavelength division multiplexers, wavelength division de-multiplexers, optical isolators and optical circulators utilized in fiber optic networks carrying wavelength division multiplexed information signals.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal." The term "wavelength," denoted by the Greek letter $\lambda$ (lambda) is used herein in two senses. In the first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1$–$\lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division de-multiplexer. This separation must occur to allow for the exchange of signals between loops within optical communications networks. The exchange typically occurs at connector points, or points where two or more loops intersect for the purpose of exchanging wavelengths. Conventional methods utilized by wavelength division de-multiplexers in separating a composite optical signal into its component channels include the use of filters and fiber gratings as separators. A "separator" or "channel separator", as used in this specification, is an integrated collection of optical components functioning as a unit which separates one or more channels of a composite optical signal from one another or else combines separate channels from separate inputs into a composite optical signal.

Additional important components of wavelength division multiplexed optical communication systems are optical comb filters, optical isolators and optical circulators. Optical comb filters supplement channel separators so as to improve the separation of channels from one another. Optical isolators prevent inadvertently reflected signals from propagating through the communications system opposite to their intended direction. Optical circulators are crucial components for permitting bi-directional communications. At present, there does not exist any single apparatus that combines the functionality of a channel separator with that of an isolator, a circulator, or a comb filter.

Accordingly, there exists a need for a multi-functional separator which is easier to align. The multi-functional separator should easily incorporate additional isolator, circulator and comb-filter functionalities. The present invention addresses such a need.

SUMMARY OF THE INVENTION

The present invention provides a multi-functional optical device. The optical device includes: a first birefringent plate; a first set of optical rotators optically coupled to the first birefringent plate, the first set of optical rotators comprising a first non-reciprocal optical rotator (NRR) and a first reciprocal optical rotator (RR); a second birefringent plate optically coupled to the first set of optical rotators at a side opposite to the first birefringent plate; and a first non-linear interferometer (NLI) optically coupled to the second birefringent plate at a side opposite to the first set of optical rotators. Provision of additional reflectors and/or optical ports leads to additional optical isolator and optical circulator functionality. Provision of additional non-linear interferometers and/or optical ports leads to additional comb filtering and or two-stage channel separation capabilities. The optical device in accordance with the present provides greater ease in alignment and functional versatility than prior-art channel separators.

BRIEF DESCRIPTION OF THE DRAWINGS

FIGS. 1e and 1f illustrate the pathways of inadvertently reflected or backward propagating signal light rays the odd channels and of the even channels, respectively, through the first preferred embodiment of the separator in accordance with the present invention.

FIGS. 1h–1j illustrate a second preferred embodiment of the separator in accordance with the present invention.

FIG. 2a illustrates a side view of a third preferred embodiment of the separator in accordance with the present invention.

FIGS. 3a–3e illustrate a fourth preferred embodiment of a separator in accordance with the present invention.

FIGS. 4a–4c illustrate a fifth preferred embodiment of the separator in accordance with the present invention.

FIGS. 5a–5e illustrate a sixth preferred embodiment of the separator in accordance with the present invention.

FIGS. 7a–7e illustrate an eighth preferred embodiment of the separator in accordance with the present invention.

DETAILED DESCRIPTION OF THE INVENTION

The present invention provides a multi-functional separator which is easier to align and more versatile than conventional separators. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 8 in conjunction with the discussion below.

Figure 1A:
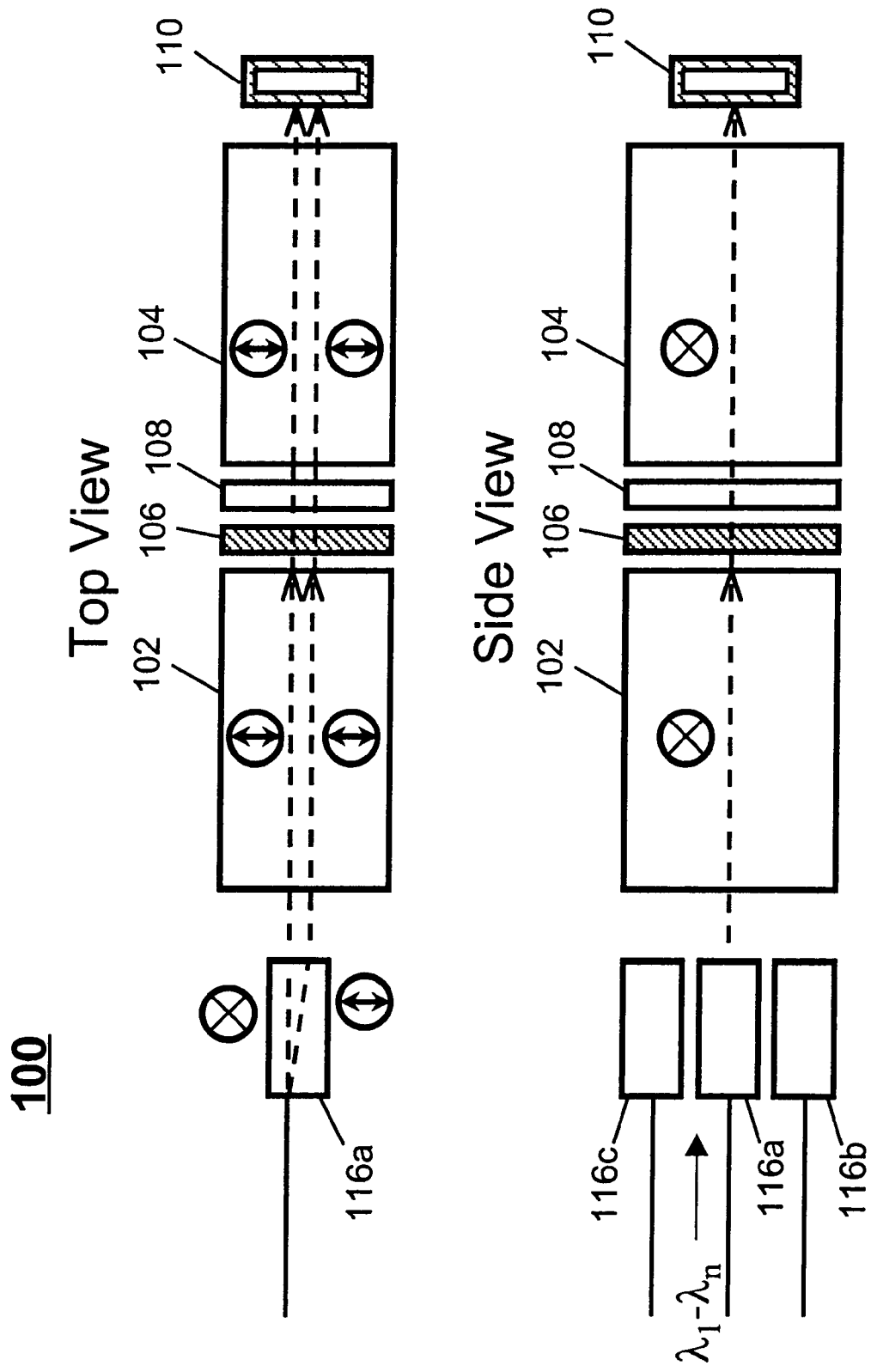
FIG. 1a illustrates a first preferred embodiment of a separator in accordance with the present invention.

FIG. 1a illustrates a first preferred embodiment of a separator in accordance with the present invention. The first preferred embodiment functions as a 1=2 channel separator and an optical isolator. The channel separator 100 receives input from a first polarizing port 116a and separates the channels therein into a first set of channels and a second set of channels, wherein the first and second sets of channels are interleaved with one another and wherein the first set of channels is output from a first polarizing output port 116b and the second set of channels is output from a second polarizing output port 116c. As shown in FIG. 1a, the separator 100 comprises a first 102 and a second 104 birefringent walk-off plate (or, simply termed, "birefringent plate") between which are disposed a non-reciprocal optical rotation element 106 and a reciprocal optical rotation element 108. The first birefringent plate 102 receives optical input from the input port 116a which is disposed adjacent to a side of the birefringent plate 102 opposite to the non-reciprocal rotator 106 and reciprocal rotator 108. A non-linear interferometer 110 is disposed adjacent to the second birefringent plate 104 at a side opposite to the non-reciprocal rotator 106 and reciprocal rotator 108. Finally, the first output port 116b and the second output port 116c are disposed to either side of the input port 116a, wherein all three the ports face the same side of the first birefringent plate 102. The input port 116a, first birefringent plate 102, second birefringent plate 104, non-reciprocal rotator 106, reciprocal rotator 108 and non-linear interferometer 110 are disposed along a line which defines a main axis or dimension of the channel separator 100.

Also shown in FIG. 1a, as well as in several following figures of this specification, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

The two birefringent plates 102–104 (FIG. 1a) each have the property of transmitting signal light comprising a first polarization (o-ray) therethrough substantially parallel to the main axis whilst simultaneously causing a deflection or offset of a signal light comprising a second polarization (e-ray). The path of the e-ray is deflected within either birefringent plate but is substantially parallel to (thereby offset from) that of the o-ray immediately upon exiting the plate. The optical axes of the two birefringent plates 102–104 are disposed such that, for e-rays passing through both such birefringent plates in a same direction, the offset of the e-ray immediately caused by passage through the second such birefringent plate is equal and opposite to the offset of the e-ray immediately caused by the passage through the first birefringent plate. As oriented in FIG. 1a and following figures, the e-rays and o-rays are polarized vertically and horizontally, respectively, during their traverses through the birefringent plates 102–104.

Figure 1B:
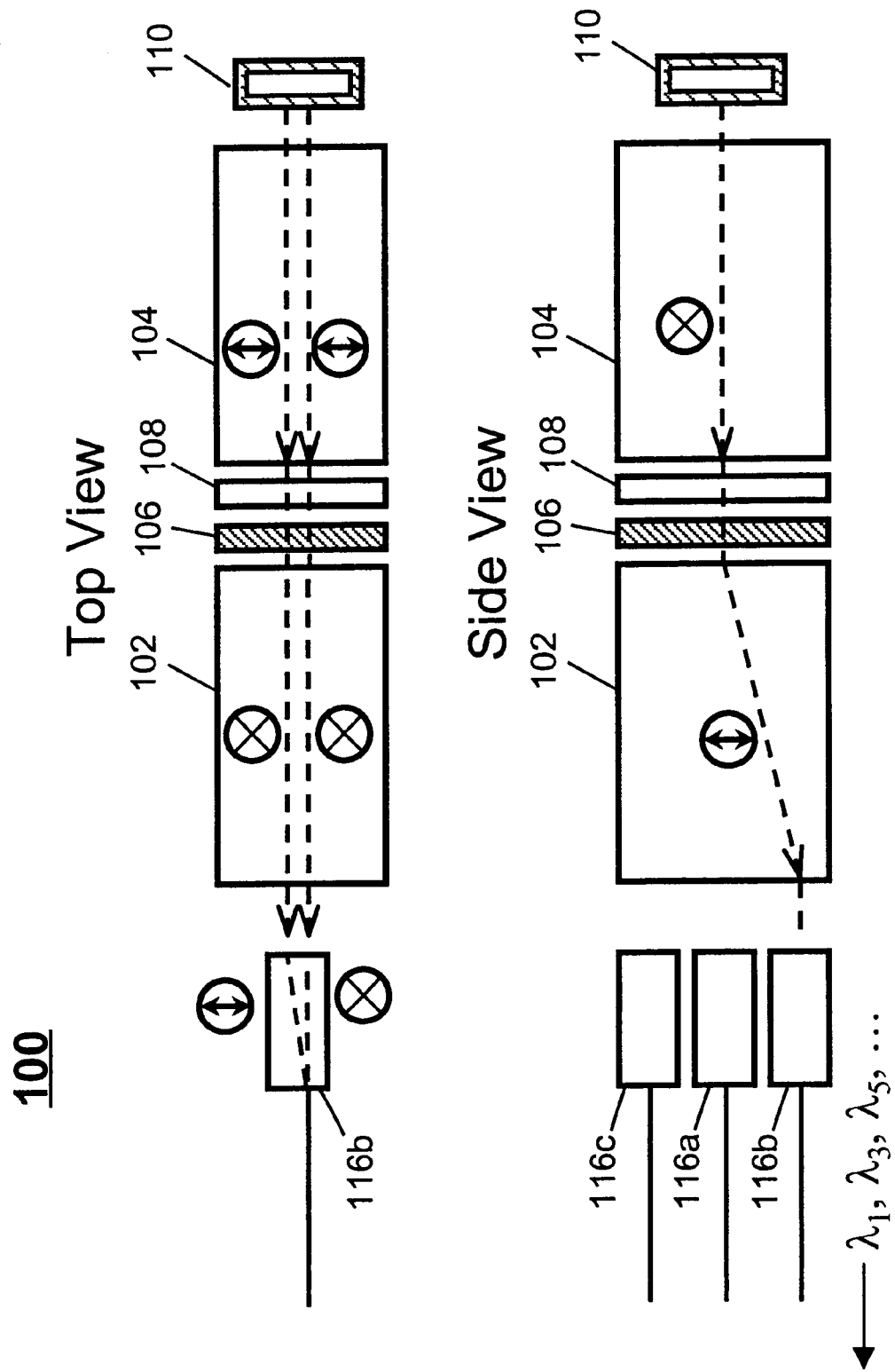
FIG. 1b illustrates a top view and a side view of the first preferred embodiment of the separator in accordance with the present invention, showing the return pathways of signal light rays of odd channels therethrough.
Figure 1C:
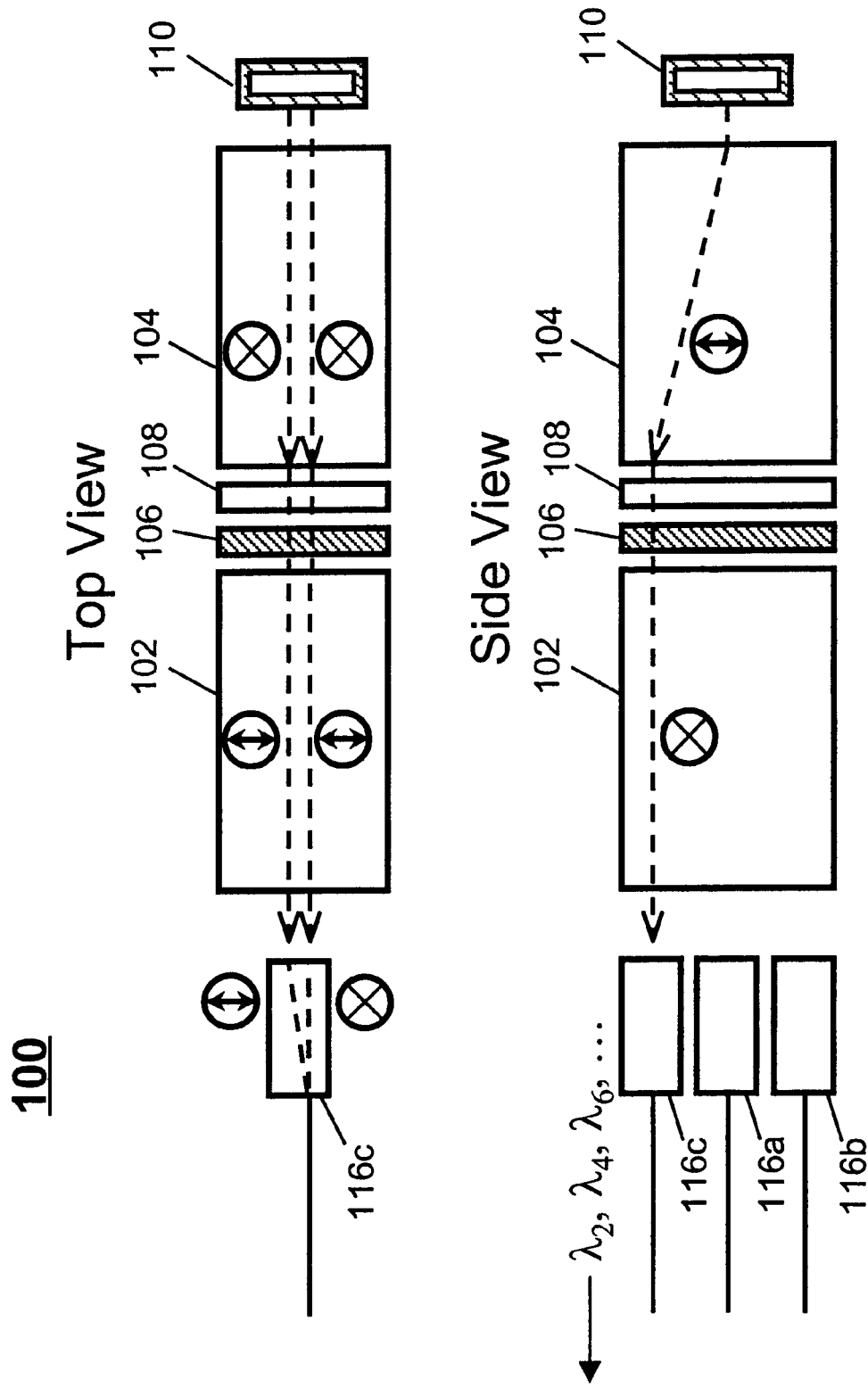
FIG. 1c is a top view and a side view of the first preferred embodiment of the separator in accordance with the present invention, showing the return pathways of signal light rays of even channels therethrough.
Figure 1D:
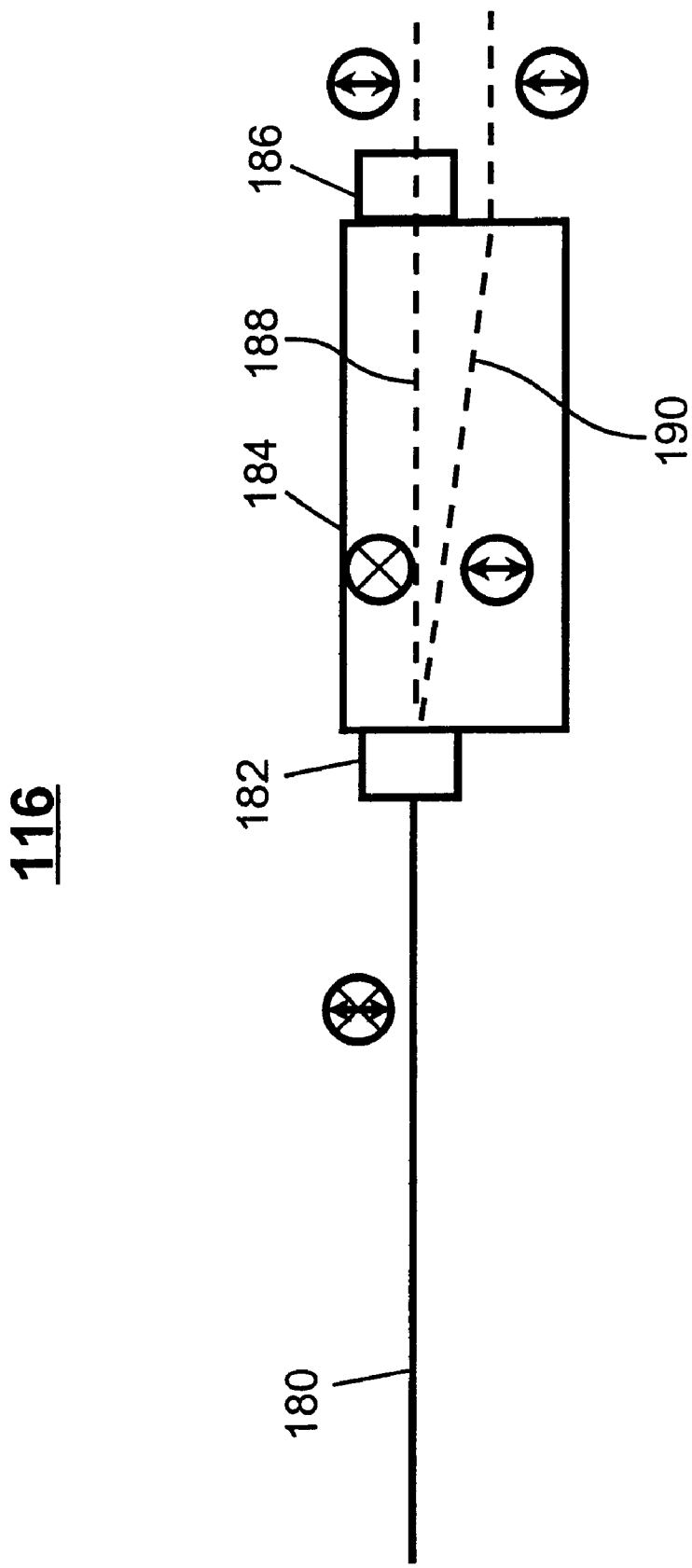
FIG. 1d provides a detailed illustration of the structure of a polarizing optical port, which is utilized either for input or output in the first preferred embodiment of the separator in accordance with the present invention.

FIG. 1d provides a detailed illustration of the structure of a polarizing optical port 116, which is utilized either for input or output in the first preferred embodiment of the separator in accordance with the present invention. The port 116 is herein termed a "polarizing port" because the port outputs light comprising only a single linear polarization orientation and can only receive light comprising the same linear polarization orientation. Unless otherwise specified, all references to "ports" within this disclosure are to be understood as referring to polarizing ports of the type illustrated in FIG. 1d. The polarizing port 116 comprises an optical fiber 180, an optical collimator 182, a birefringent walk-off plate 184 and a reciprocal optical rotator 186. The optical collimator 182 is optically coupled to the optical fiber 180 and either receives input from or directs output to the fiber 180. When the optical fiber 180 is utilized to deliver input light, the collimator 182 receives diverging light rays from the optical fiber and sets these rays parallel to one another so as to form a light beam. When the optical fiber 180 receives output light, the collimator 182 focuses a beam of collimated light into the end face of the fiber 180.

The birefringent walk-off plate 184 of the polarizing port 116 (FIG. 1d) is optically coupled to the collimator 182 at a side opposite to the fiber 180 and has the property of physically separating an unpolarized light beam received from collimator 182 into a deflected light beam 190 and a substantially un-deflected light beam 188. The deflected light 190 comprises an e-ray having a first linear polarization orientation and the un-deflected light 188 comprises an o-ray having a second linear polarization orientation perpendicular to that of the e-ray.

Immediately after passing through the birefringent walk-off plate 184 of the polarizing port 116 (FIG. 1d), the two beams 188–190 emerge parallel to one another but have mutually orthogonal polarization orientations. The reciprocal optical rotator 186, which is optically coupled to the birefringent walk-off plate 184 at a side opposite to the collimator 182, is disposed so at to intercept the path of only one of the two beams 188–190. The reciprocal optical rotator 186 rotates the polarization orientation of said intercepted beam by 90° so as to be parallel to that of the other beam. In the reverse light propagation direction, that is, when the polarizing port 116 (FIG. 1d) is utilized as an output port, the optical rotator 186 rotates the polarization orientation of only one of two beams so that said beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190.

Referring once again to FIG. 1a, the pathways and polarization orientations of forward propagating input signal rays are shown in both top view (top diagram) and side view (lower diagram). The complete set of two input beams, as separated by input port 116a, is only visible in the top view. Signal light, which is comprised of a plurality of wavelength division multiplexed channels $\lambda_1$–$\lambda_n$, is input to the first birefringent plate 102 of channel separator 100 through input port 116a such that the two separated input beams both comprise undeflected o-rays with respect to the first birefringent plate 102. This signal light subsequently passes through the birefringent plate 102 and then through the non-reciprocal optical rotator 106 and the reciprocal optical rotator 108. The elements 106–108 are disposed such that light passing through both from left to right does not experience polarization plane rotation.

The return pathways (that is, the pathways after reflection from and interaction with the non-linear interferometer 110) of odd and even channels through the channel separator 100 are respectively shown in FIG. 1b and FIG. 1c. The non-linear interferometer 110 has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. The non-linear interferometer 110 is disclosed in co-pending U.S. Patent Applications entitled, "Non-Linear Interferometer for Fiber Optic Wavelength Division Mutiplexer Utilizing a Phase Differential Method of Wavelength Separation," Ser. No. 09/401,686, filed on Sep. 23, 1999; and entitled "Dense Wavelength Division Multiplexer Utilizing an Asymmetric Pass Band Interferometer", Ser. No. 09/388,350 filed on Sep. 1, 1999. Applicant hereby incorporates these patent applications in their entirety by reference.

As illustrated in the lower diagram of FIG. 1b, the light of the reflected odd channels, whose polarization is not rotated by the non-linear interferometer 110, remains polarized as an o-ray with respect to the second birefringent plate 104 and therefore passes without deflection directly through the birefringent plate 104 towards the reciprocal optical rotator 108 and non-reciprocal optical rotator 106. Contrariwise, as illustrated in the lower diagram of FIG. 1c, the light of the reflected even channels, whose polarization plane is rotated by 90° upon reflection from non-linear interferometer 110, is polarized as an e-ray with respect to the second birefringent plate 104 and therefore is deflected within the birefringent plate 104.

During passage from right-to-left through the pair of elements 106–108, the polarization plane orientation of the light of the odd channels (FIG. 1b) and of the even channels (FIG. 1c) is rotated by 90°. The light of the odd channels and of the even channels thus becomes polarized as an e-ray and as an o-ray, respectively, within the first birefringent plate 102. The first birefringent plate 102 therefore deflects the light comprising the odd channels (FIG. 1b) but allows the light comprising the even channels (FIG. 1c) to pass directly therethrough without deflection.

The optic axes of the two birefringent plates 102–104 are not parallel to one another but are, instead, symrnetrically oriented with respect to one another about a vertical plane perpendicular to the axis of separator 100. Because of this disposition of the two optic axes, the offsets of odd channels polarized as e-rays in birefringent plate 102 and of even channels polarized as e-rays in birefringent plate 104 are opposite to one another as illustrated in FIG. 1b and FIG. 1c.

Subsequent to passing through the birefringent plate 102 in the return direction, the odd channels and even channels are directed to the first output port 116b and to the second output port 116c, respectively as illustrated in FIGS. 1b–1c. As described previously, the two physically separate beams comprising each set of output channels are recombined by each respective output port and focused into the respective fiber of the port. The first input port 116b (second input port 116c) is disposed so as to only receive vertically (horizontally) polarized light and thus receives the vertically (horizontally) polarized light of the odd channels (even channels) upon exit of this light from the birefringent plate 102. In this fashion the separator 100 behaves as a wavelength division de-multiplexer.

FIGS. 1e and 1f illustrate the pathways of inadvertently reflected or backward propagating signal light rays of the odd channels and of the even channels, respectively, through the first preferred embodiment of the separator in accordance with the present invention. Such backward propagating light is polarized vertically upon being output from port 116b (FIG. 1e) or horizontally upon being output from port 116c (FIG. 1f). The backward propagating light emitted or reflected from port 116b and 116c subsequently passes through the first birefringent plate 102 as a deflected e-ray (FIG. 1e) or as an undeflected o-ray (FIG. 1f), respectively, and passes through the non-reciprocal optical rotator 106, the reciprocal optical rotator 108 and the second birefringent plate 104 in this order. Upon passing through the rotators 106–108 from left to right, the backward propagating light of the odd channels (FIG. 1e) and of the even channels (FIG. 1f) does not incur polarization rotation and thus remains vertically and horizontally polarized, respectively. Thus, the backward propagating light of the odd channels (FIG. 1e) and of the even channels (FIG. 1f) remains polarized as a deflected e-ray and as an undeflected o-ray, respectively, within the second birefringent plate 104. Because of the relative disposition of the optic axes of the two birefringent plates 102–104, there is no net offset of either light upon passing completely through the birefringent plate 102, the non-reciprocal optical rotator 106, the reciprocal optical rotator 108 and the second birefringent plate 104 in this order (FIGS. 1e, 1f). The inadvertently reflected or backward propagating light is thus prevented from being directed to any of the ports 116a–116c. In this fashion, the channel separator 100 performs the function of an optical isolator.

Figure 1G:
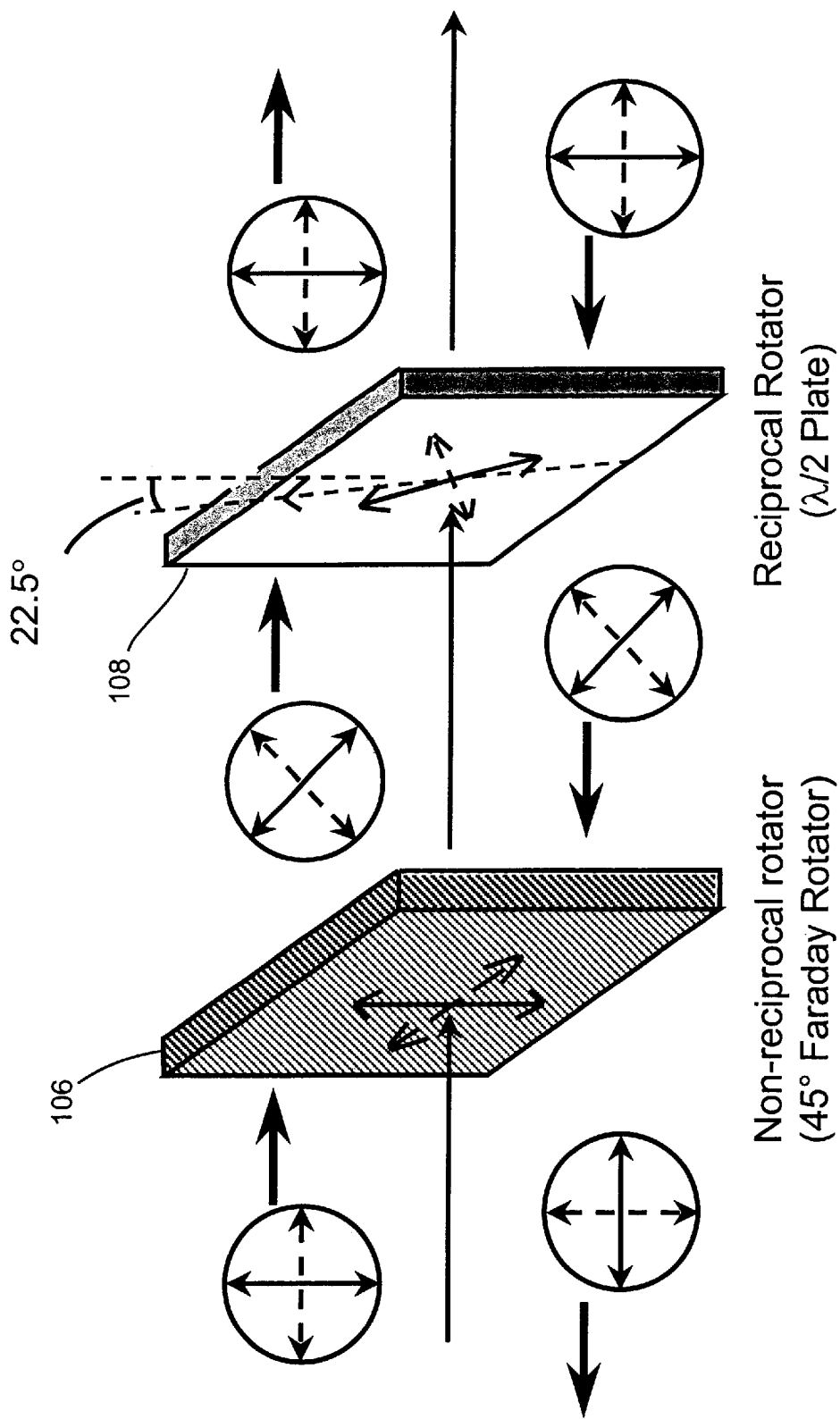
FIG. 1g illustrates in more detail a light polarization rotation upon propagation through a non-reciprocal optical rotation element together with a reciprocal optical rotation element.

FIG. 1g illustrates in more detail a light polarization rotation upon propagation through a non-reciprocal optical rotation element together with a reciprocal optical rotation element. In particular, FIG. 1g illustrates one possible configuration in which the non-reciprocal optical rotator 106 comprises a Faraday rotator that rotates the polarization plane of linearly polarized light by 45° counter clockwise (as viewed from the left side of the apparatus) and the reciprocal optical rotator 108 comprises a half-wave plate with its optical axis disposed at 22.5° to the vertical. Other configurations are also possible and the invention is not meant to be limited to the particular disposition of these two components shown in FIG. 1g.

The 45 degree Faraday rotation element 106, which is well-known in the art, is typically comprised of a ferromagnetic oxide crystal such as yttrium iron garnet (YIG) or else of a diamagnetic glass with a high lead oxide content, or a paramagnetic glass or cubic crystal containing various ions such as trivalent cerium or terbium. The optical rotation of the Faraday rotator 106 typically occurs in response to an externally applied axial magnetic field provided by adjacent permanent magnets or an electromagnet (not shown). In FIG. 1g, double-barbed arrows inscribed within circles represent the orientations of linearly polarized light as viewed from the left side of the pair of components 106–108. Two possible polarization orientations are shown inscribed within each circle, wherein one such polarization orientation is indicated by a dashed arrow for ease of reference. The non-reciprocal optical rotator 106 always rotates the polarization plane of light passing therethrough in either direction by 45° counter clockwise (as viewed from the left side of the separator 100) and, for the illustrated polarization orientations, the reciprocal optical rotator 108 always rotates the polarization plane of light passing therethrough by 45° clockwise (as viewed from the side at which the light enters the rotator 108). By tracing the polarization orientations in either direction through the two optical rotators 106–108, it can be seen that the net polarization plane rotation is zero for light propagating from left to right and is 90° for light propagating from right to left.

Figure 1J:
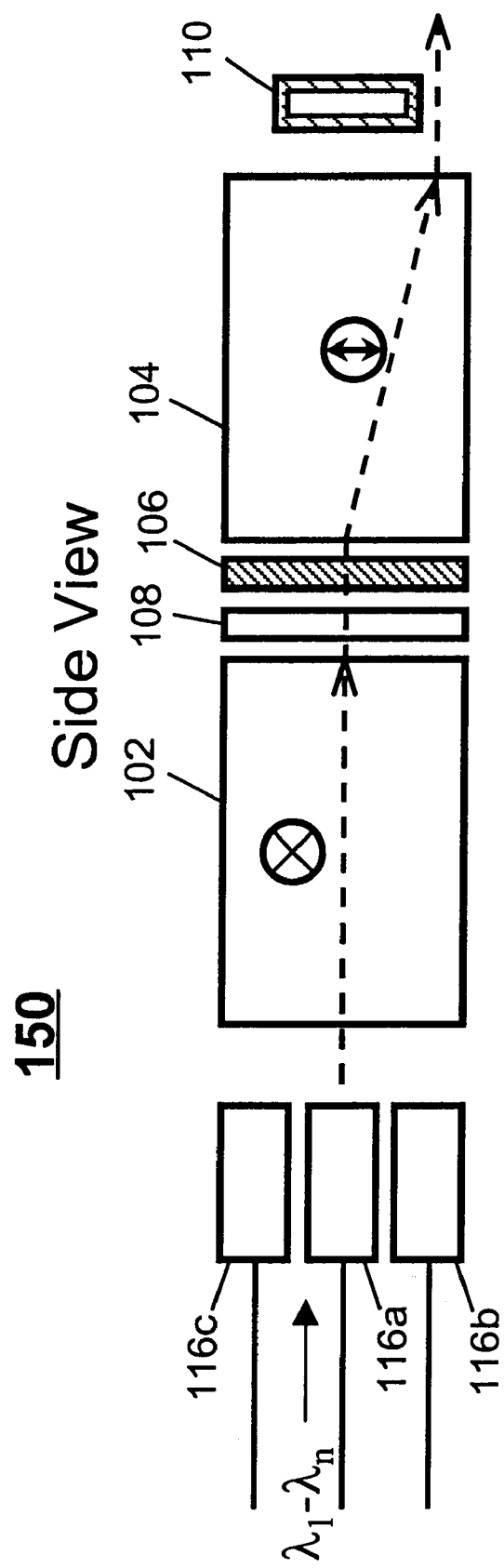

FIGS. 1h–1j illustrate a second preferred embodiment of the separator in accordance with the present invention. The second preferred embodiment functions as a 2×1 dense wavelength division multiplexer and an optical isolator. The multiplexer 150 illustrated in FIGS. 1h–1j comprises all the components and dispositions previously described in reference to the channel separator 100 (FIGS. 1a–1f) except that the positions of the non-recipocal rotator 106 and the reciprocal rotator 108 are interchanged with one another. In the multiplexer 150 (FIGS. 1h–1j), the ports 116b and 116c serve to input signal light comprising odd channels and even channels, respectively, to the multiplexer 150 and the port 116a serves to output signal light from the multiplexer 150. Because of the disposition of the rotators 106–108 in multiplexer 150, linearly polarized light passing completely through the pair of rotators 106–108 from right to left does not experience polarization plane rotation whereas linearly polarized light passing completely therethrough from left to right incurs a 90°-polarization plane rotation.

FIG. 1h illustrates the forward pathways—that is, pathways up to the non-linear interferometer 110—of signal light rays of both even and odd channels through the multiplexer 150. As shown in FIG. 1h, light that is input to multiplexer 150 from the port 116b and the port 116c is polarized vertically and horizontally, respectively, as a result of the polarization functionality of the ports. Light input to multiplexer 150 from either of the ports 116b–116c passes through the first birefringent plate 102, the reciprocal optical rotator 108, the non-reciprocal optical rotator 106 and the second birefringent plate 104 in this order and then to the non-linear interferometer 110. The odd-channel signal light 152a and the even-channel signal light 152b comprise a deflected e-ray and an undeflected o-ray, respectively, within the first birefringent plate 102 as shown in FIG. 1h. Subsequently, both the odd-channel signal light 152a and the even-channel signal light 152b pass through with the reciprocal optical rotator 108 and the non-reciprocal optical rotator 106 from left to right. Therefore, the polarization plane of the odd-channel signal light 152a and the even-channel signal light 152b is rotated so as to pass through the second birefringent plate 104 as a horizontally-polarized, un-deflected o-ray and as a vertically polarized deflected e-ray, respectively (FIG. 1h). Because of the opposing nature of the deflection of the odd channels in the first birefringent plate 102 and of the even channels in the second birefringent plate 104, the pathways of the odd and even channels are combined immediately upon exit from the second birefringent plate 104 and just prior to being reflected from the non-linear interferometer 110 (FIG. 1h).

FIG. 1i illustrates the return pathways-that is, pathways subsequent to reflection from the non-linear interferometer 110—of signal light rays of odd channels and even channels through the multiplexer 150. Upon interaction with and reflection from the nonlinear interferometer 110 the polarization plane of the signal light comprising the even channels is rotated so as to become horizontally polarized whilst the polarization plane of the signal light comprising the odd channels remains horizontally polarized. Therefore, as shown in FIG. 1i, the combined signal light 152a–152b comprising the odd and the even channels is reflected from non-linear interferometer 110 with horizontal polarization. This horizontally polarized combined light comprises o-rays within the second birefringent plate 104 and thus passes undeflected through the second birefringent plate 104 towards and through the non-reciprocal optical rotator 106 and the reciprocal optical rotator 108. In the multiplexer 150, the pair of components 106–108 comprises the property such that linearly polarized light passing completely therethrough from right to left does not incur polarization plane rotation. Thus the returning signal light 152a–152b remains as a horizontally polarized o-ray within the first birefringent plate 102. As shown in FIG. 1i, this horizontally polarized combined signal light of odd and even channels is transmitted undeflected through the first birefringent plate 102 so as to be output from the multiplexer 150 through the port 116a. In this fashion, the apparatus 150 performs as a multiplexer, such that odd channels input from port 116b and even channels input from port 116c are all output from the single port 116a.

FIG. 1j illustrates the optical isolator functionality of the second preferred embodiment of the separator in accordance with the present invention. FIG. 1j shows the pathways therethrough of signal light rays inadvertently input to the multiplexer 150 from port 116a. As shown in FIG. 1j, such light rays are delivered from port 116a with horizontal polarization. Since this horizontally polarized light comprises an o-ray within the first birefringent plate 102, this inadvertently input signal light passes undeflected through the first birefringent plate 102 to and through the pair of optical rotators 106–108. In the multiplexer 150, the pair of optical rotators 106–108 comprises the property such that linearly polarized light passing completely therethrough from left to right incurs incurs a 90°-polarization plane rotation. Therefore, upon passing through the pair of optical rotators 106–108, the inadvertently input signal light is transformed to a vertically polarized e-ray within the second birefringent plate 104. As is shown in FIG. 1j, the second birefringent plate 104 deflects this vertically polarized light so that it exits the multiplexer 150 without entering either of the ports 116b–116c. In this fashion, the multiplexer 150 performs as an optical isolator.

FIG. 2a illustrates a side view of a third preferred embodiment of the separator in accordance with the present invention. The third preferred embodiment functions as a 1×2 dense wavelength division de-multiplexer and an optical circulator according to another embodiment of the present invention. The channel separator 200 (FIG. 2a) comprises all the components of the channel separator 100 (FIGS. 1a–1f). These common components have similar dispositions and reference numbers in the figures representing both channel separator 100 and channel separator 200. In addition to the components comprising the channel separator 100, the channel separator 200 comprises a polarization beam splitter (PBS) 202, a reflector 204 and a fourth optical port 206, wherein the additional components are all disposed at the same side of the second birefringent plate 104 as the non-linear interferometer 110.

FIG. 2a shows the pathways through channel separator 200 of a first signal light ray 210a input to the separator 200 from the second port 116b and of a second signal light ray 210b input to the separator 200 from the third port 116c. These pathways through the channel separator 200 through the first birefringent plate 102, the non-reciprocal optical rotator 106, the reciprocal optical rotator 108 and the second birefringent plate 104 are similar to those illustrated in FIGS. 1e–1f and are not further described. After exiting from the second birefringent plate 104, the first 210a and second 210b signal light ray intercept the polarization beam splitter 202 and the reflector 204, respectively. The vertical polarization of the first signal light ray 210a comprises p-polarization with respect to the PBS 202 and thus this ray 210a passes straight through the PBS 202. On the other hand, the horizontal polarization of the second signal light ray 210b comprises s-polarization with respect to both the reflector 204 and the PBS 202. Therefore, the second signal light ray 210b is preferentially reflected at the reflector 204 and at the PBS 202. The reflector 204 is disposed so as to reflect the signal light ray 210b towards and into the PBS 202, at which the ray is reflected once again so as to join the pathway of signal light ray 210a. The co-propagating signal light rays 210a–210b are then both directed into the fourth port 206, from which they are output from the channel separator 200. Because the fourth port 206 receives light comprising more than one polarization, the port 200 does not comprise a polarizing port of the type illustrated in FIG. 1d. The port 206 may be a conventional optical port comprising a collimating lens optically coupled to an optical fiber.

Figure 2B:
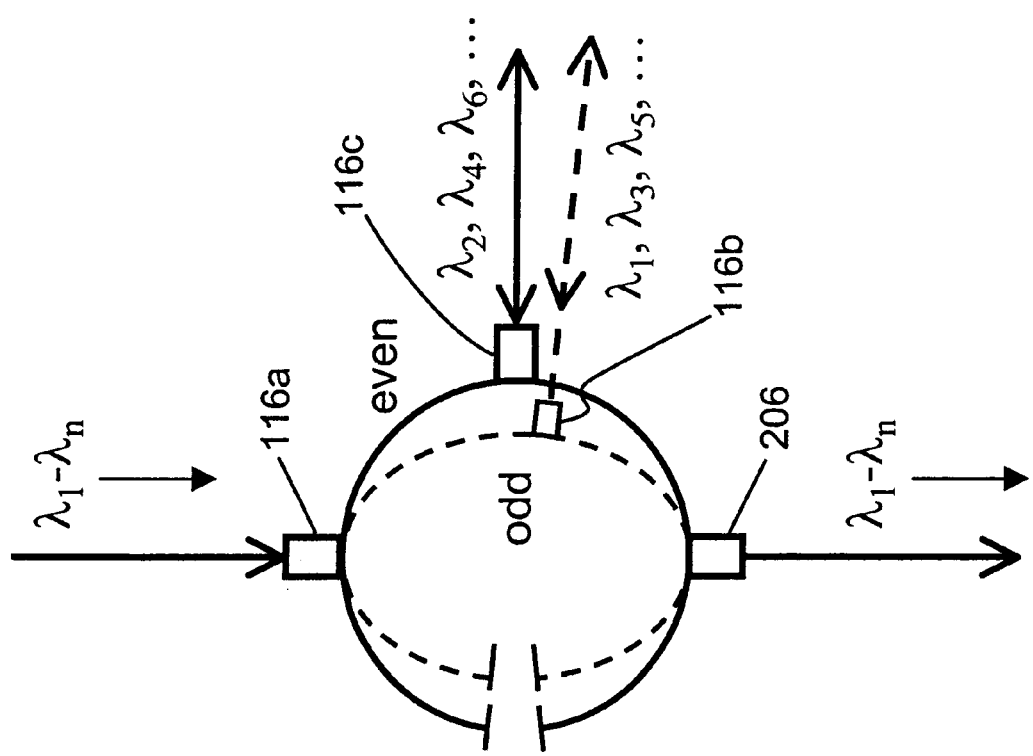
FIG. 2b illustrates the signal routing performed by the third preferred embodiment of the separator in accordance with the present invention.

FIG. 2b illustrates the signal routing performed by the third preferred embodiment of the separator in accordance with the present invention. In the separator 200, the port 116a comprises an input port, the port 206 comprises an output port and the ports 116b–116c comprise ports utilized for both input and output. Light comprising a plurality of wavelength division multiplexed channels input to separator 200 through input port 116a is separated into two sets of channels—a set of "odd" channels $\lambda_1, \lambda_3, \lambda_5, \ldots$ which is directed to and output from the input/output port 116b and a set of "even" channels $\lambda_2, \lambda_4, \lambda_6, \ldots$ which is directed to and output from the input/output port 116c—by the separator 200. Simultaneously with or alternatively to this channel separation, channels may be input to the separator 200 through one or both of the input/output ports 116b–116c. Such channels, input from either port 116b or 116c, are not directed to port 116a but are instead directed to output port 206 so as to be output from the separator 200. In this fashion, the separator 200 simultaneously functions as both a channel separator and as a pair of independent three-port optical circulators—one circulator for odd channels (dashed lines in FIG. 2b) and another for even channels.

FIGS. 3a–3e illustrate a fourth preferred embodiment of a separator in accordance with the present invention. The fourth preferred embodiment functions as a 1×2 dense wavelength division de-multiplexer, an optical comb filter and an optical isolator. In the channel separator 300, the input port 116a, the first birefringent plate 102, the second birefringent plate 104, the non-linear interferometer 110, the non-reciprocal optical rotator 106, and the reciprocal optical rotator 108, are common to and are disposed similarly to the similarly numbered components comprising the channel separator 100 (FIGS. 1a–1f). However, in the separator 300 (FIGS. 3a–3e), a second non-linear interferometer 302 and a third non-linear interferometer 304 are disposed to either side of the input port 116a adjacent to the first birefringent plate 102. Also, in the separator 300, the first 116b and the second 116c output ports are disposed facing the birefringent plate 104 at the same side of the birefringent plate 104 as the non-linear interferometer 110. Still further, in the separator 300, a second non-reciprocal optical rotator 306 and a second reciprocal optical rotator 308 are disposed adjacent to one another between the two birefringent plates 102–104, and a third non-reciprocal optical rotator 310 and a third reciprocal optical rotator 312 are also disposed adjacent to one another between the two birefringent plates 102–104. Both the pair of optical rotators 306–308 and the pair of optical rotators 310–312 are disposed such that the polarization orientation of polarized light passing therethrough from left to right is rotated by 90° whilst the polarization orientation of polarized light passing therethrough from right to left is not rotated.

As will be described in more detail following, the channel separator 300 comprises the same channel separation and optical isolation functionalities as the channel separator 100 and further comprises an optical comb filtering functionality. The channel separation functionality performed by the components common to the separator 100 comprises a first channel separation stage and the comb filtering functionality comprises a second filtering stage sequentially cascaded with the first stage.

Figure 3A:
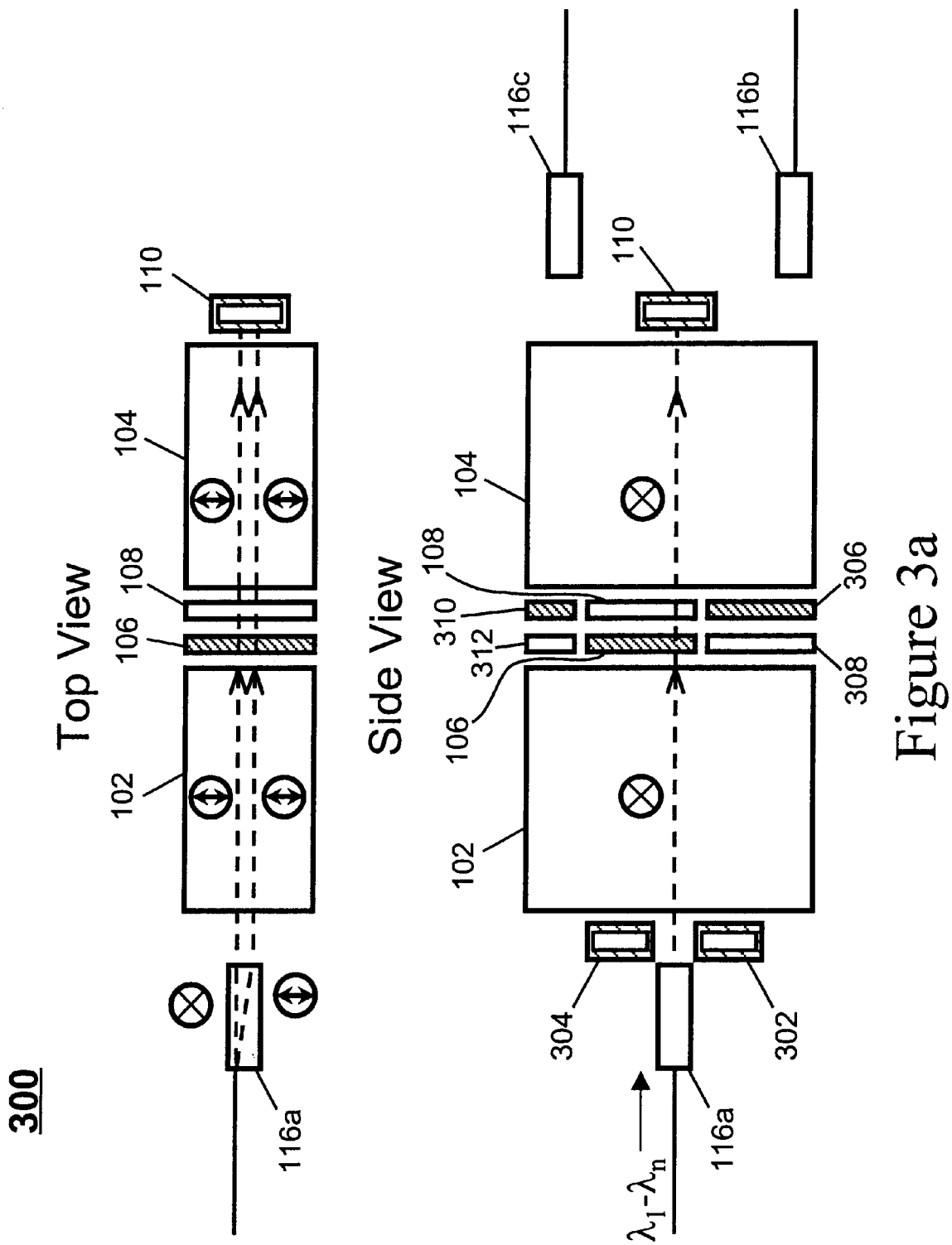
Figure 3B:
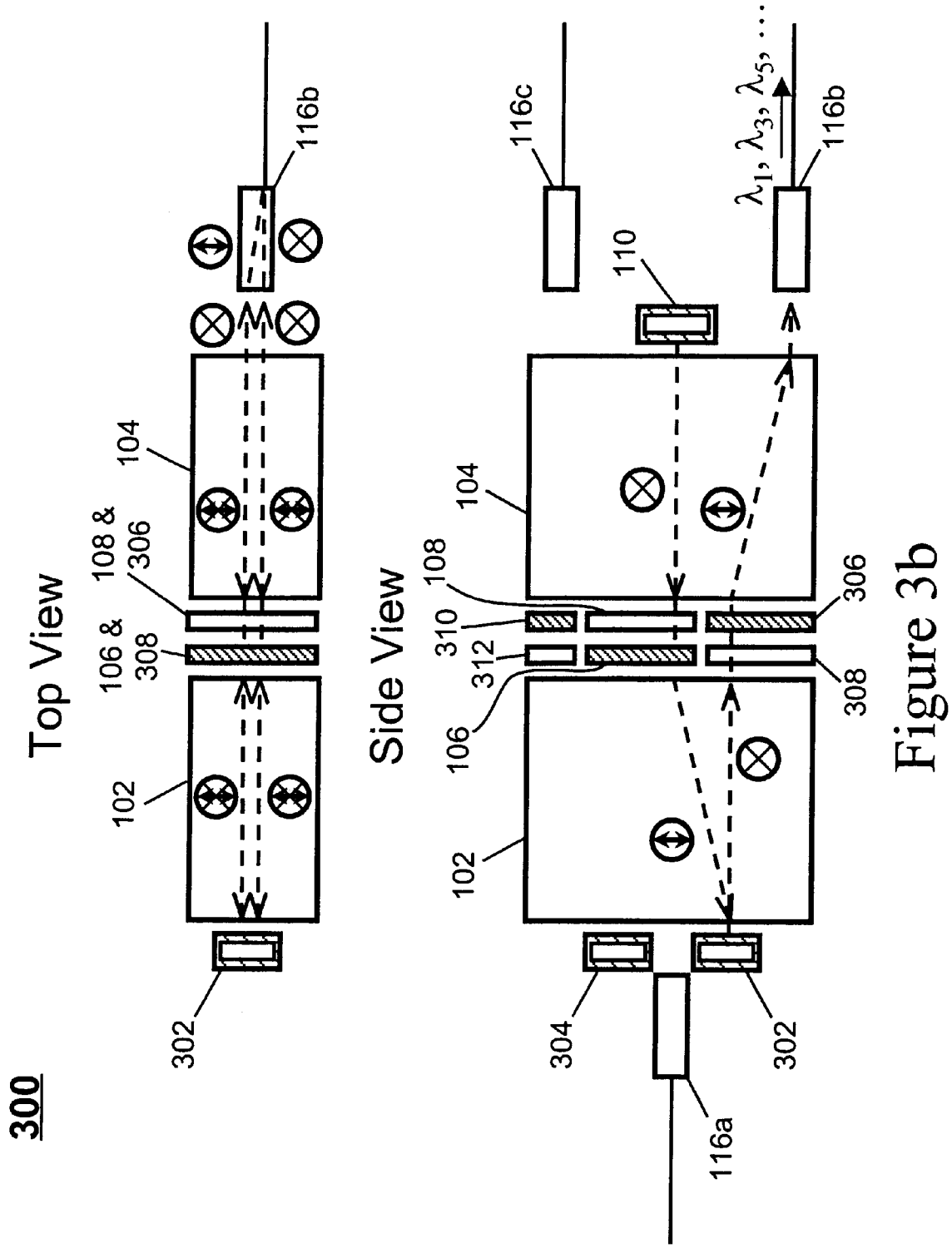
Figure 3C:
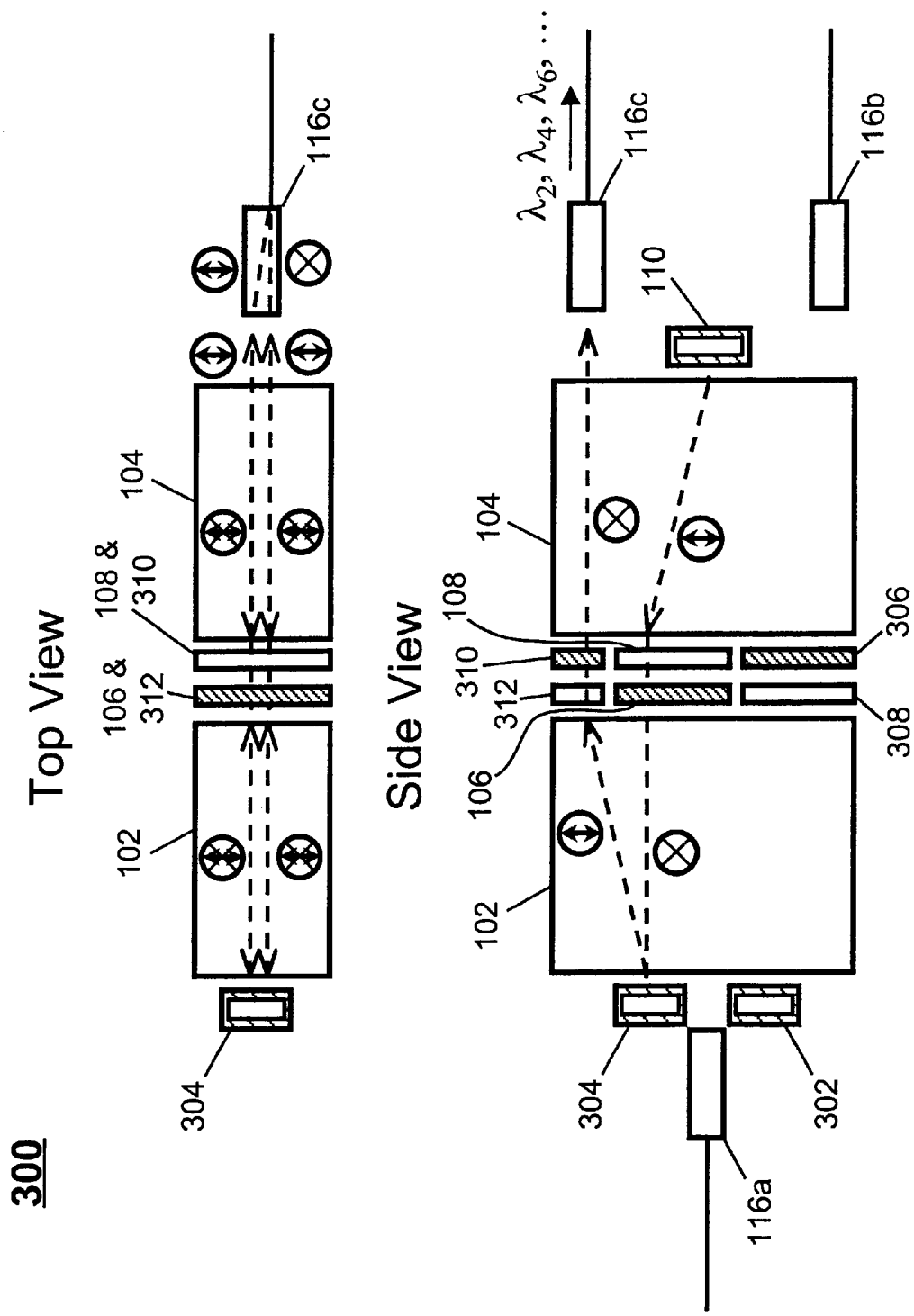
Figures 3D, 3E:
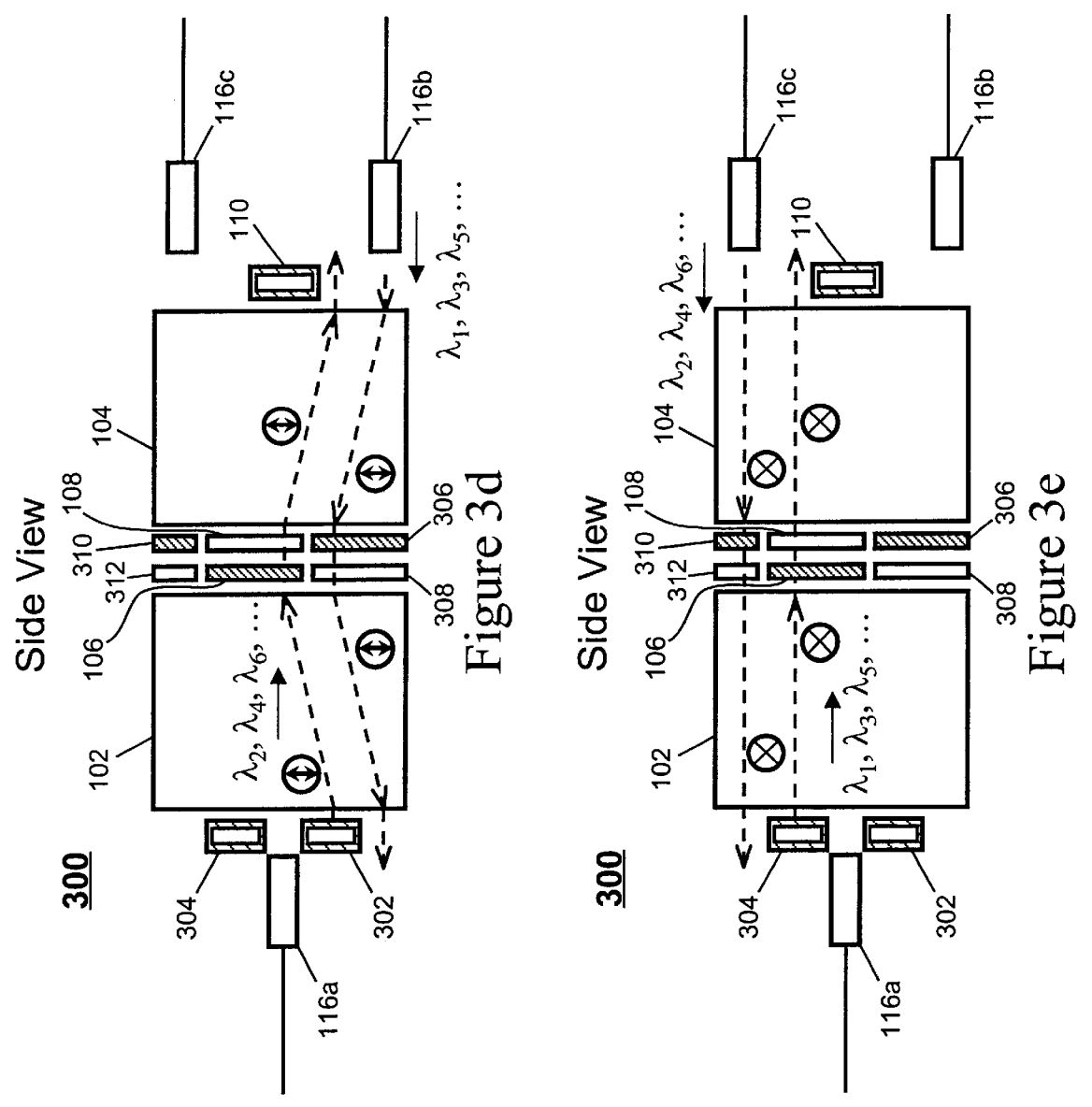
Figure 3F:
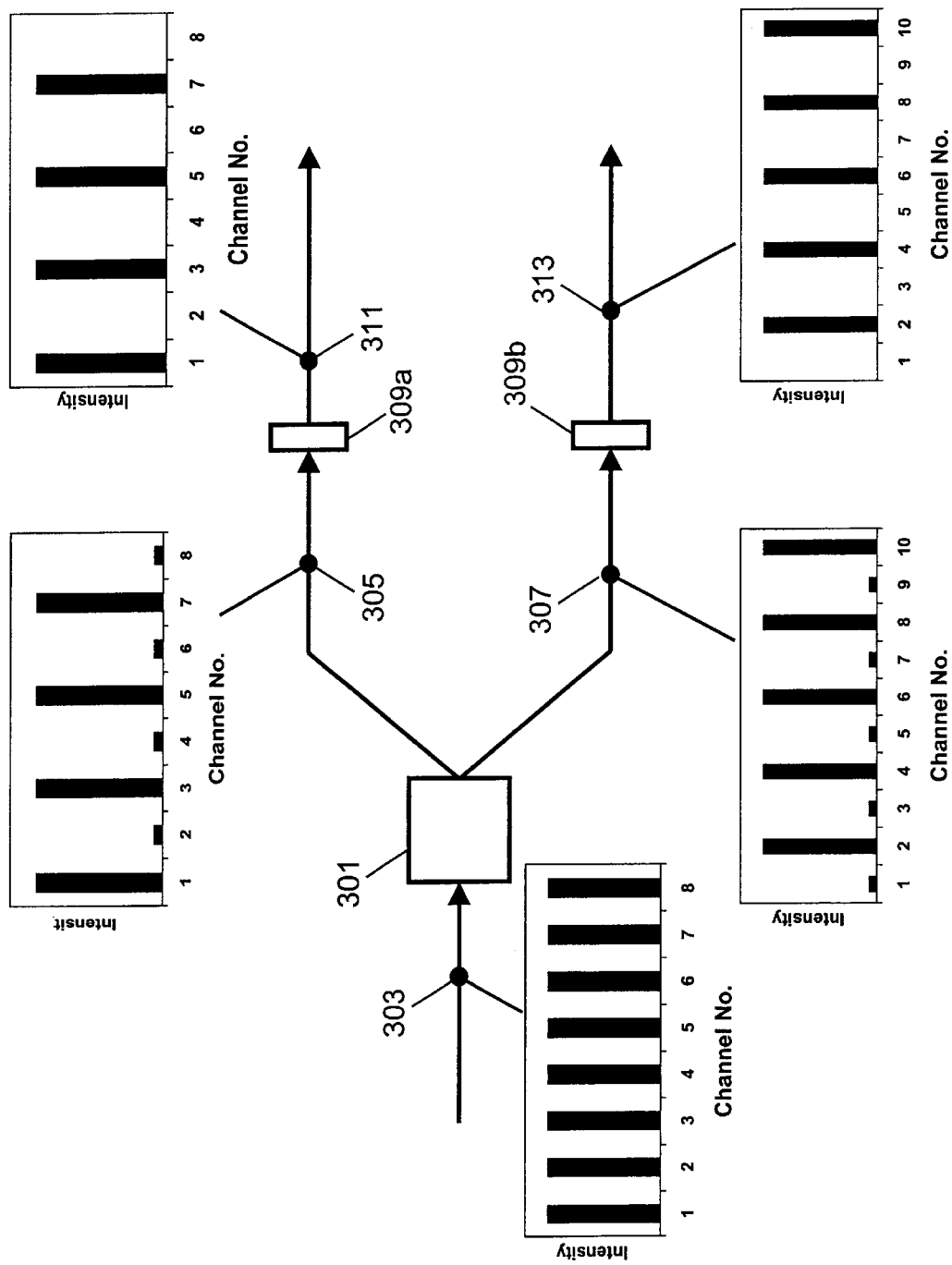
FIG. 3f illustrates a schematic representation of optical channels as they are transmitted through the channel separator stage supplemented by the channel comb filter stage of the fourth preferred embodiment of the separator in accordance with the present invention.

FIG. 3f illustrates a schematic representation of optical channels as they are transmitted through the channel separator stage supplemented by the channel comb filter stage of the fourth preferred embodiment of the separator in accordance with the present invention. The channel separator stage 301 initially separates an initial composite optical input signal 303, comprised of a plurality of optical channels, into two composite optical signals each comprising a subset of the channels-a first signal subset 305 comprised primarily of "odd" channels and a second subset 307 comprised primarily of "even" channels, respectively. Histograms attached to each signal and signal subset represent, hypothetically, the intensities of the channels comprising each such composite optical signal. If the channel separator 301 is perfect, then the signal 305 is comprised only of odd channels and the signal 307 is comprised only of even channels. However, since, in general, the separator 301 is not perfect, there is some "leakage" of even channels into signal 305 and of some odd channels into signal 307.

As shown in FIG. 3f, to increase the degree of isolation of the odd channel signal 305 from the even channels and of the even channel signal 307 from the odd channels, two optical channel comb filters, 309a and 309b, respectively, are incorporated into the apparatus. The first optical channel comb filter 309a (second optical channel comb filter 309b) is designed so as to transmit a high proportion of the intensity of the odd (even) channels and a negligible proportion of the intensity of the even (odd) channels. Taken together, the channel separator and each of the dense optical channel comb filters provides an acceptable level of isolation of the resulting odd channel and even channel signals, 311 and 313, respectively.

FIG. 3a illustrates the pathway through the separator 300 of signal light rays comprising a plurality of wavelength division multiplexed channels $\lambda_1$–$\lambda_n$ from the input port 116a to the first non-linear interferometer 110. This pathway is similar to the forward pathway through the separator 100 illustrated in FIG. 1a and described in reference to that figure and is not re-described.

FIGS. 3b and 3c illustrate the pathways of signal light rays comprising the odd channels $\lambda_1$, $\lambda_3$, $\lambda_5$, ... and the even channels $\lambda_2$, $\lambda_4$, $\lambda_6$, ..., respectively, after being reflected from the first non-linear interferometer 110. The portion of the pathway of the odd channels from the non-linear interferometer 10 to the point of exit from the first birefringent plate 102 (FIG. 3b) is similar to that illustrated for separator 100 in FIG. 1b. Likewise, the portion of the pathway of the even channels from the non-linear interferometer 110 to the point of exit from the first birefringent plate 102 (FIG. 3c) is similar to that illustrated for separator 100 in FIG. 1c. However, after exiting first birefringent plate 102, the signal light comprising the odd channels interacts with and is reflected by the second non-linear interferometer 302 (FIG. 3b) and the signal light comprising the even channels interacts with and is reflected by the third non-linear interferometer 304 (FIG. 3c).

The second non-linear interferometer 302 is configured so as to rotate by 90° the polarization plane orientation of odd channels reflected therefrom whilst leaving unchanged the polarization plane orientation of even channels reflected therefrom. Conversely, the third non-linear interferometer 304 is configured so as to rotate by 90° the polarization plane orientation of even channels reflected therefrom whilst leaving unchanged the polarization plane orientation of odd channels reflected therefrom. Therefore, as illustrated in FIG. 3b, upon reflection from the second non-linear interferometer 302, the polarization plane orientation of signal light comprising the odd channels changes from vertical to horizontal so that it returns to the first birefringent plate 102 as an o-ray. Likewise, as illustrated in FIG. 3c, upon reflection from the third non-linear interferometer 304, the polarization plane orientation of signal light comprising the even channels changes from horizontal to vertical so that it returns to the first birefringent plate 102 as an e-ray.

After reflection from the second non-linear interferometer 302 (FIG. 3b), the signal light comprising the odd channels passes, in turn, through the first birefringent plate 102, the second reciprocal optical rotator 308, the second non-reciprocal optical rotator 306, and the second birefringent plate 104. Also, after reflection from the third non-linear interferometer 304 (FIG. 3c), the signal light comprising the even channels passes, in turn, through the first birefringent plate 102, the third reciprocal optical rotator 312, the third non-reciprocal optical rotator 310, and the second birefringent plate 104. Because both of the signal lights pass through either the pair of optical rotators 306–308 or the pair of optical rotators 310–312 from left to right, the polarization of both such lights is rotated by 90° upon passing therethrough. Thus, the signal light comprising the odd channels (FIG. 3b) and that comprising the even channels (FIG. 3b) passes through the second birefringent plate 104 as a vertically polarized, deflected e-ray and as a horizontally polarized undeflected o-ray, respectively. These respective pathways are such that the odd channels are directed to and into the output port 116b whilst the even channels are directed to and into the output port 116c. Thus, in this fashion the separator 300 performs the function of a 1×2 de-multiplexer.

The second and third non-linear interferometers 302–304 facilitate the comb filtering function of the separator 300 as illustrated in FIGS. 3d–3e. For instance, although the second non-linear interferometer 302 predominantly receives light comprising odd channels (FIG. 3b), the second non-linear interferometer 302 may receive a small proportion of misdirected and undesired vertically polarized light comprising even channels as a result of possible imperfect operation of the first non-linear interferometer 110. Similarly, the third non-linear interferometer 304 may receive a small proportion of misdirected and undesired horizontally polarized light comprising odd channels.

FIGS. 3d–3e respectively show the pathways of such misdirected even channels and misdirected odd channels through the separator 300. The second non-linear interferometer 302 is configured so as to reflect the light comprising the even channels without a change in optical polarization and, therefore, such undesired light comprising even channels returns to the first birefringent plate 102 as a vertically polarized e-ray (FIG. 3d). The third non-linear interferometer 304 is configured so as to reflect the light comprising the odd channels without a change in optical polarization and, therefore, such undesired light comprising odd channels returns to the first birefringent plate 102 as a horizontally polarized o-ray (FIG. 3e).

FIGS. 3d–3e also illustrate the pathways through separator 300 of inadvertently reflected or reverse propagating light rays output from the port 116b or the port 116c, respectively. For illustration purposes, these undesired reflected channels from port 116b and from port 116c are shown as odd channels in FIG. 3d and as even channels in FIG. 3e, respectively. However, it is to be kept in mind that the undesired reverse propagating light rays or signal light rays could comprise wavelengths of any or all channels. Such undesired, inadvertently reflected or reverse propagating light rays are output from the port 116b with vertical polarization and thus enter the second birefringent plate 104 as vertically polarized e-rays (FIG. 3d). The undesired, inadvertently reflected or reverse propagating light rays are output from the port 116c with horizontal polarization and thus enter the second birefringent plate 104 as horizontally polarized o-rays (FIG. 3e).

The undesired, misdirected signal light rays and the undesired, inadvertently reflected or reverse propagating light rays either pass through the pair of optical rotators 106–108 from left to right, through the pair of optical rotators 306–308 from right to left, or through the pair of optical rotators 310–312 from right to left (FIGS. 3d–3e). In each such case, there is no net rotation of the optical polarization direction. Subsequently, the light rays enter the next birefringent plate-either plate 102 or plate 104—along their respective propagation direction (FIGS. 3d–3e). Because such undesired light rays propagate through both birefringent plates 102–104 as either e-rays or o-rays and because the optic axes of such plates are symmetrically oriented with respect to one another about a vertical plane as previously described, then, on passing through both such plates 102–104 sequentially, such undesired light rays incur no net offset or deflection (FIGS. 3d–3e). Therefore, such undesired light rays exit the separator 300 without being directed to any output port (FIGS. 3d–3e). In this fashion, the separator 300 functions as a pair of optical comb filters, wherein the comb filters are arranged in parallel cascade arrangement with respect to the initial channel separation stage as shown in FIG. 3f, and also functions as an optical isolator.

FIGS. 4a–4c illustrate a fifth preferred embodiment of the separator in accordance with the present invention. The fifth preferred embodiment functions as a 2×1 dense wavelength division multiplexer as well as an optical isolator and optical comb filter. The multiplexer 400 (FIGS. 4a–4c) is identical in construction to the channel separator 300 (FIGS. 3a–3e) except that each adjacent pair of optical rotators functions in the reverse sense from the corresponding pair of rotators in the channel separator 300. For example, in the multiplexer 400, the pair of optical rotators 106–108 rotates by 90° the polarization plane of light propagating therethrough from left to right, instead of from right to left as in channel separator 300. This reverse-sense operation relative to channel separator 300 also applies for the pair of optical rotators 306–308 and 310–312. In this specification, a drafting convention is adopted such that the polarization orientation of linearly polarized light is rotated by 90 degrees upon passing through a reciprocal optical rotator and a non-reciprocal optical rotator in sequence but experiences no net rotation upon passing through a non-reciprocal and a reciprocal optical rotator in sequence. Thus, FIGS. 4a–4c, the reverse-sense operation of the pair of optical rotators is illustrated by simple interchange of the positions of the two optical rotators within each pair of rotators 106–108, 306–308 and 310–312. However, one of ordinary skill in the art will readily envision many alternative means of accomplishing the forward-sense and reverse-sense operation of the optical rotators. Neither the multiplexers nor demultiplexers in accordance with the present invention need be limited to any particular sequence of optical rotators within a pair of adjacent optical rotators.

FIG. 4a illustrates the pathways of signal light rays between each of the ports 116b–116c and the non-linear interferometer 110 within multiplexer 400. FIG. 4b illustrates the continuation of the signal light pathways from the non-linear interferometer 110 to the port 116a. FIG. 4c illustrates the pathway of signal light rays inadvertently reflected or input from the port 116a. Because each pair of adjacent optical rotators 106–108, 306–308 and 310–312 functions in the reverse sense from the corresponding pair of rotators in the channel separator 300, the pathways of signal light rays are exactly reversed from those in the channel separator 300. Therefore, in the multiplexer 400, signal light rays comprising odd channels $\lambda_1, \lambda_3, \lambda_5, \ldots$ input from port 116b are combined with signal light rays comprising even channels $\lambda_2, \lambda_4, \lambda_6, \ldots$ input from port 116c so as to all be output from port 116a. In this fashion, the apparatus 400 operates as a 2×1 multiplexer. Also, as illustrated in FIG. 4c, light input from port 116a is prevented from being output at either of the ports 116b–116c. In this fashion, the multiplexer 400 operates as an optical isolator. Finally, because each signal light interacts with two non-linear interferometers, the multiplexer 400 also operates as an optical comb filter, so as to prevent any stray odd channel (even channel) signal light that may be input from port 116c (port 116b) from being output at port 116a.

FIGS. 5a–5e illustrate a sixth preferred embodiment of the separator in accordance with the present invention. The sixth preferred embodiment functions as a 1×2 dense wavelength division de-multiplexer, an optical comb filter and an optical isolator. In the channel separator 500 (FIGS. 5a–5e), the input port 116a, the output ports 116b–116c, the non-linear interferometer 110, the non-reciprocal optical rotator 106, and the reciprocal optical rotator 108, are common to and are disposed similarly to the similarly numbered components comprising the channel separator 100 (FIGS. 1a–1f). The separator 500 further comprises a pair of birefringent plates 502–504 that are disposed similarly to the birefringent plates 102–104, respectively, comprising the separator 100. However, compared to the birefringent plates 102–104, the birefringent plates 502–504 provide only one-half the amount of offset of e-rays passing completely therethrough. Assuming that the birefringent plates 102–104 and 502–504 comprise the same material, then this implies that the birefringent plates 502–504 are one-half as long, along a line parallel to the device main axis, as are the birefringent plates 102–104, respectively (FIGS. 1a–1f).

Figures 5D, 5E:
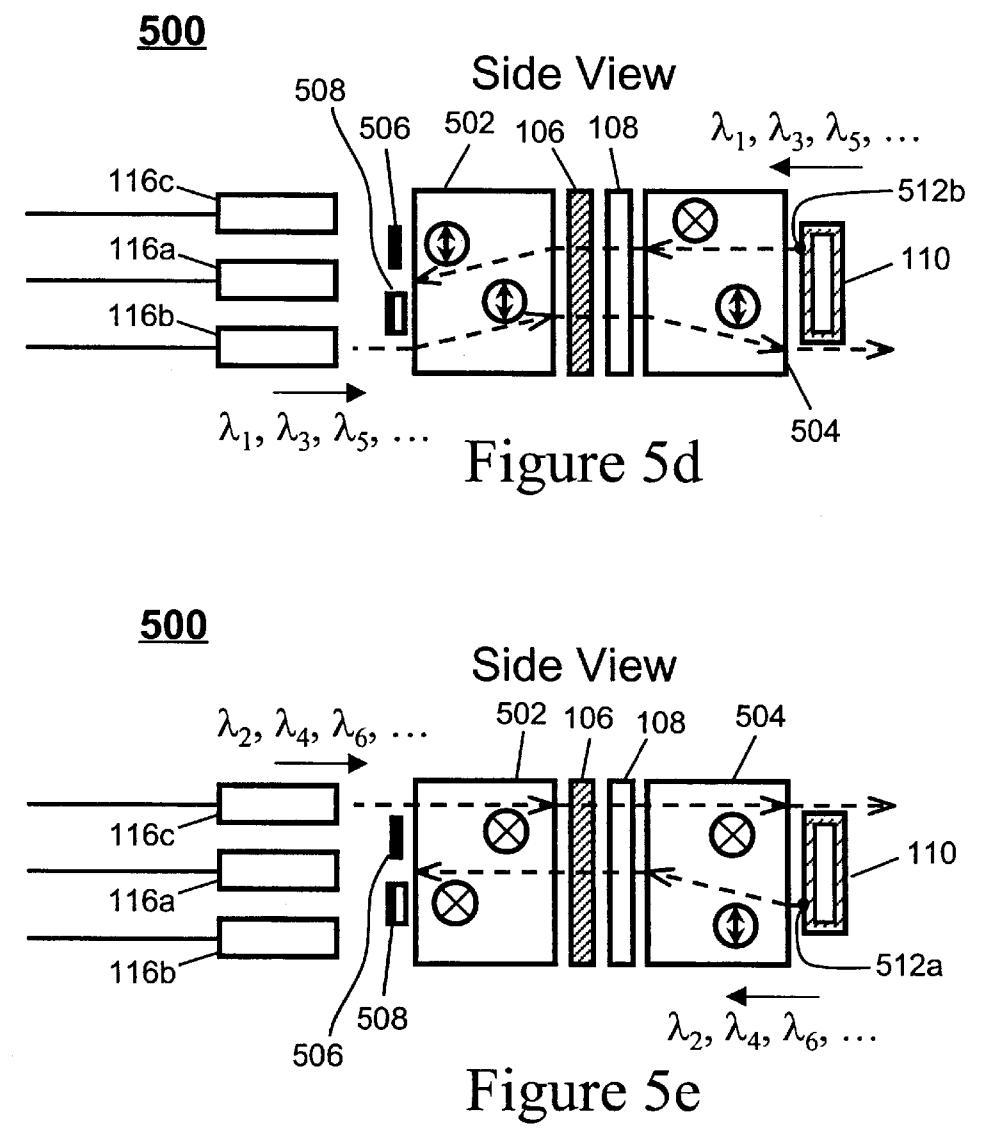
Figure 5F:
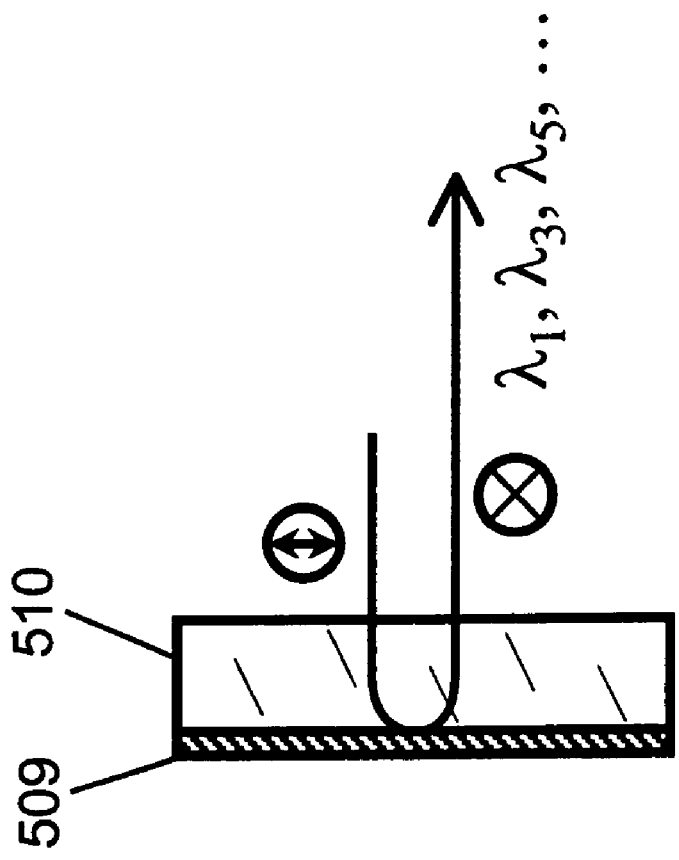
FIG. 5f illustrates an expanded view of the polarization rotating reflector utilized in the sixth preferred embodiment in accordance with the present invention.

Further, the separator 500 (FIGS. 5a–5e) comprises a reflector 506 and a polarization-rotating reflector 508, which are both disposed adjacent to and optically coupled to the first birefringent plate 502. In the vertical dimensional component, the reflector 506 is disposed between the input port 116a and the port 116c and the polarization-rotating reflector 508 is disposed between the input port 116a and the port 116b as shown in FIGS. 5a–5e. Polarized light is reflected at the reflector 506 without a change in polarization orientation but is reflected at the polarization-rotating reflector 508 with a 90° rotation of polarization orientation. Preferably, the reflector 506 comprises a simple flat mirror and the polarization-rotating reflector 508 comprises a mirror 509 together with a quarter-wave plate 510 optically coupled to the front of the mirror 509 (FIG. 5f).

FIG. 5a illustrates the pathways of wavelength division multiplexed light comprising channels $\lambda_1$–$\lambda_n$ from the input port 116a to the non-linear interferometer 110. FIGS. 5b–5c illustrate the pathways of signal light rays comprising the odd channels $\lambda_1, \lambda_3, \lambda_5, \ldots$ and the even channels $\lambda_2, \lambda_4, \lambda_6, \ldots$, respectively, after being reflected from the first non-linear interferometer 110. The separator 500 functions similarly to the separator 100 (FIGS. 1a–1f) except that signal light makes two complete round trips—each round trip comprising one forward segment and one return segment—sequentially through the separator 500, in contrast to the single round trip completed by light in the separator 100. The first such round trip corresponds to the channel separator stage 301 illustrated in FIG. 3f. The second such round trip completed by the signals comprising the odd channels (FIG. 5b) and by the even channels (FIG. 5c) comprises the comb filter stage 309a and 309b, respectively, of FIG. 3f.

The portion of the pathway of the odd channels during the first round trip through separator 500 (FIG. 5b) is similar to the single round trip pathway illustrated for odd channels within separator 100 (FIGS. 1a–1b). However, the amount of offset of the pathway of the odd channels within separator 500 measured perpendicularly to the main axis is only one-half of the offset of the odd channels within separator 100. Likewise, the portion of the pathway of the even channels during the first round trip through separator 500 (FIG. 5c) is similar to that illustrated for separator 100 in FIGS. 1a and 1c. However, the amount of offset of the pathway of the even channels within separator 500 is only one-half of the offset of the even channels within separator 100. The amount of offset per round trip through the separator 500 is such that, after making a first round trip therethrough and exiting from the birefringent plate 502, the signal light does not enter either of the output ports 116b–116c. Instead, after completing such a first round trip, the signal light comprising the odd channels is reflected by the polarization-rotating reflector 508 (FIG. 5b) and the signal light comprising the even channels is reflected by the reflector 506 (FIG. 5c).

Just prior to being reflected at the polarization-rotating reflector 508, the light comprising odd channels is vertically polarized (FIG. 5b). However, just after reflection at the polarization-rotating reflector 508, this odd channel light is polarized horizontally. The light comprising even channels remains horizontally polarized both before and after reflection at reflector 506 (FIG. 5c). Thus, at the beginning of a second round trip through the separator 500, signal light comprising both odd and even channels re-enters birefringent plate 502 with horizontal polarization. Therefore, except for the addition of a respective constant offset perpendicular to the main axis or dimension of separator 500, the second round trips of signal light rays through the separator 500 are similar to the first round trips therethrough. The combined offset, after two round trips, of the pathways of the light comprising the odd channels is such that this light is directed towards and into the output port 116b as shown in FIG. 5b. Likewise, after two round trips the light comprising the even channels is directed towards and into output port 116c as shown in FIG. 5c. In this fashion, the apparatus 500 performs the function of a 1×2 channel separator.

The second round trips of light rays through the separator 500 facilitate the comb filtering function of the separator 500 as illustrated in FIGS. 5d–5e. For instance, the light received by the non-linear interferometer 110 at point 512a (FIG. 5e) and at point 512b (FIG. 5d) predominantly comprises signal light of odd channels (FIG. 5b) and of even channels (FIG. 5c), respectively. However, the non-linear interferometer 110 may receive a small proportion of misdirected and undesired signal light comprising even channels at point 512a and comprising odd channels at point 512b as a result of possible imperfect operation of the non-linear interferometer 110 during the first round trip. FIGS. 5d–5e illustrate the pathways through separator 500 of such misdirected and undesired odd-channel light rays and even channel light rays, respectively. FIGS. 5d–5e also illustrate pathways of inadvertently reflected or backward propagating light rays input to the separator 500 from port 116b and from port 116c, respectively.

The misdirected signal light comprising even channels and comprising odd channels is horizontally polarized just prior to entering the non-linear interferometer 110 at point 512a and at point 512b, respectively. The non-linear interferometer 110 has the property such that the polarized light comprising the odd channels is reflected therefrom without any polarization plane rotation whereas the reflected light comprising the even channels is reflected therefrom with a 90° polarization plane rotation. Thus, the misdirected light comprising the odd channels reflects from point 512b with horizontal polarization and re-enters birefringent plate 504 as a horizontally polarized and undeflected o-ray (FIG. 5d). Also, the light comprising the misdirected even channels reflects from point 512a with vertical polarization and re-enters birefringent plate 504 as a vertically polarized, deflected e-ray (FIG. 5e).

After being reflected from non-linear interferometer 110 at point 512b and at point 512a, respectively, the light comprising the odd channels and the light comprising the even channels then passes from right to left, in turn, through the birefringent plate 504, through the pair of optical rotators 106–108 and through the birefringent plate 502. Upon passing through the pair of optical rotators 106–108 from right to left, polarized light incurs a net 90° rotation of its polarization. Therefore, the misdirected light comprising the odd channels traverses through birefringent plate 502 as a vertically polarized and deflected e-ray (FIG. 5d) and the misdirected light comprising the even channels traverses through birefringent plate 502 as a horizontally polarized o-ray (FIG. 5e). Both the misdirected light comprising the odd channels and comprising the even channels then exits from birefringent plate 502 adjacent to the input port 116a. In this fashion, the separator 500 performs a comb filtering function, since misdirected odd channel light is effectively prevented from entering the port 116c and misdirected even channel light is effectively prevented from entering the port 116b.

FIGS. 5d–5e also illustrate pathways of inadvertently reflected or backward propagating light rays input to the separator 500 from port 116b and from port 116c, respectively. For illustration purposes, these undesired reflected channels from port 116b and from port 116c are shown as odd channels in FIG. 5d and as even channels in FIG. 5e, respectively. However, it is to be kept in mind that the undesired reverse propagating light rays or signal light rays could comprise wavelengths of any or all channels. Such undesired, inadvertently reflected or reverse propagating light rays are output from the port 116b with vertical polarization and thus enter the birefringent plate 502 as vertically polarized e-rays (FIG. 5d). The undesired, inadvertently reflected or reverse propagating light rays are output from the port 116c with horizontal polarization and thus enter the birefringent plate 502 as horizontally polarized o-rays (FIG. 5e).

The undesired inadvertently reflected or reverse propagating light rays pass through the birefringent plate 502 and then through the pair of optical rotators 106–108. Because the light rays pass from left to right through the pair of optical rotators 106–108, they incur no net rotation of the optical polarization direction upon passing therethrough. Subsequently, the light rays enter the birefringent plate 504. Because such undesired light rays propagate through both birefringent plates 102–104 as either e-rays or o-rays and because the optic axes of such plates are symmetrically oriented with respect to one another about a vertical plane as previously described, then, on passing through both such plates 102–104 sequentially, such undesired light rays incur no net offset or deflection (FIGS. 5d–5e). Therefore, such undesired light rays exit the separator 500 without being directed to any output port (FIGS. 5d–5e). In this fashion, the separator 500 functions as an optical isolator.

Figure 6:
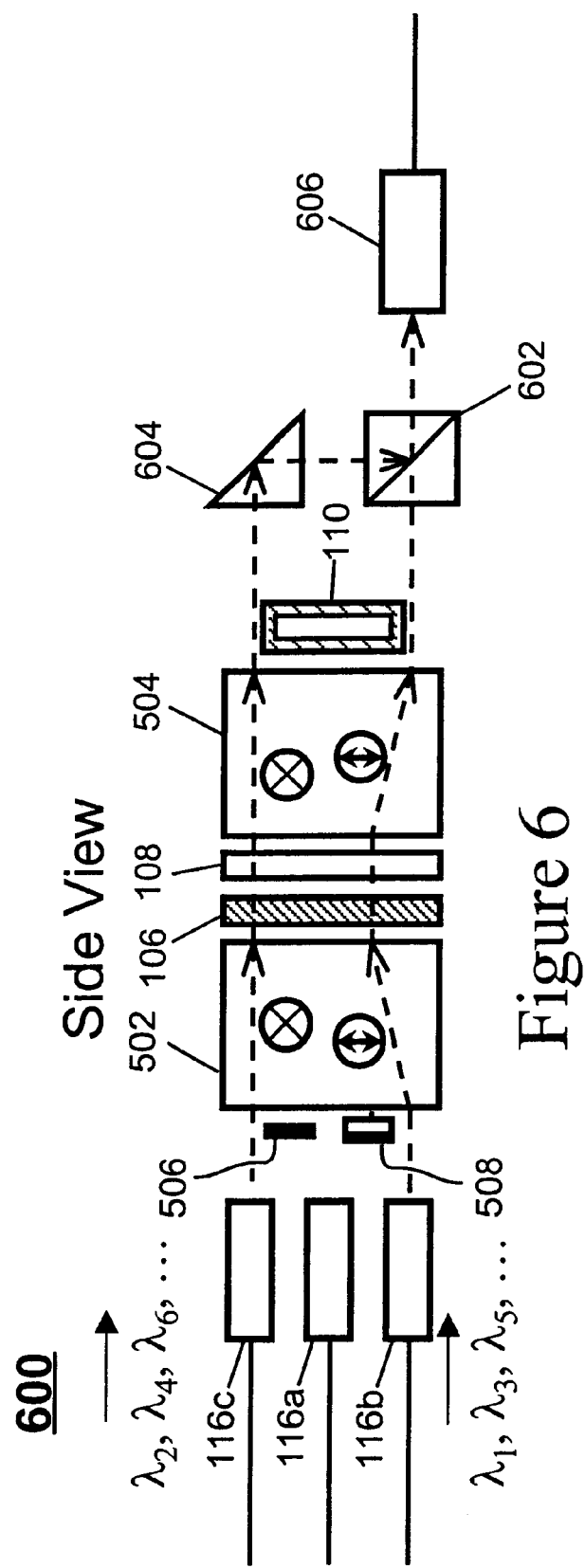
FIG. 6 illustrates a view of a seventh preferred embodiment of the separator in accordance with the present invention.

FIG. 6 illustrates a side view of a seventh preferred embodiment of the separator in accordance with the present invention. The seventh preferred embodiment functions as a 1×2 dense wavelength division de-multiplexer, an optical comb filter and an optical circulator. The channel separator 600 comprises all the components of the channel separator 500 (FIGS. 5a–5f). These common components have similar dispositions and reference numbers in the figures representing both channel separator 500 and channel separator 600. In addition to the components comprising the channel separator 500, the channel separator 600 comprises a polarization beam splitter (PBS) 602, a reflector 604 and a fourth optical port 606, wherein the additional components are all disposed at the same side of the second birefringent plate 504 as the non-linear interferometer 110.

Because of the replication of components, the separator 600 performs the same channel separation and comb filtering functions as the channel separator 500 (FIGS. 5a–5e). The separator 600 also performs the function of an optical circulator. This circulator functioning is similar to that already described in reference to the separator 200 as illustrated in FIGS. 2a–2b. Because the fourth port 606 receives light comprising more than one polarization, the port 606 does not comprise a polarizing port of the type illustrated in FIG. 1d. The port 606 may be conventional optical port comprising a collimating lens optically coupled to an optical fiber. Because of the similarity of the optical circulator function of separator 600 to that of the separator 200 (FIGS. 2a–2b), this circulator function is not further described.

FIGS. 7a–7e illustrate an eighth preferred embodiment of the separator in accordance with the present invention. The eighth preferred embodiment functions as a 1×4 dense wavelength division de-multiplexer. In the channel separator 700 (FIG. 7a), an input set of wavelength division multiplexed channels $\lambda_1$–$\lambda_n$ is divided into two channel subsets in a first internal channel separation stage and each such subset is further divided into two smaller subsets in a subsequent second stage. Each of the four channel subsets resulting from the sequentially arranged two divisions is then output to a different respective output port.

In the channel separator 700, the three ports 116a–116c, the first birefringent plate 102, the second birefringent plate 104, the first non-linear interferometer 110, the first non-reciprocal optical rotator 106, the first reciprocal optical rotator 108, the second non-reciprocal optical rotator 306, the second reciprocal optical rotator 308, the third non-reciprocal optical rotator 310 and the third reciprocal optical rotator 312 are all common to and are disposed similarly to the respective similarly numbered components comprising the channel separator 300 (FIGS. 3a–3e). Further, the channel separator 700 (FIG. 7a) comprises an additional two output ports 116d–116e, a second non-linear interferometer 706 and a third non-linear interferometer 708.

In the channel separator 700, the second 706 and third 708 non-linear interferometers comprising channel separator 700 comprise a periodicity—that is, a wavelength difference at which the properties of light reflected from the interferometer are repeated—that is double that of first non-linear interferometer 110. The second 706 and the third 708 non-linear interferometers that comprise channel separator 700 are disposed similarly to the non-linear interferometers 302–304 of channel separator 300 with respect to the common components.

The mutually adjacent optical rotators 306–308 comprising channel separator 700 (FIG. 7a) are disposed such that polarized light passing through both elements from left to right incurs a 90° polarization plane rotation whilst polarized light passing through both elements from right to left does not incur any polarization plane rotation. Also, the mutually adjacent optical rotators 310–312 are disposed such that polarized light passing through both elements from left to right incurs a 90° polarization plane rotation whilst polarized light passing through both elements from right to left does not incur any polarization plane rotation. Note that this is opposite to the behavior of polarized light passing through the pair of optical rotators 106–108.

Figure 7A:
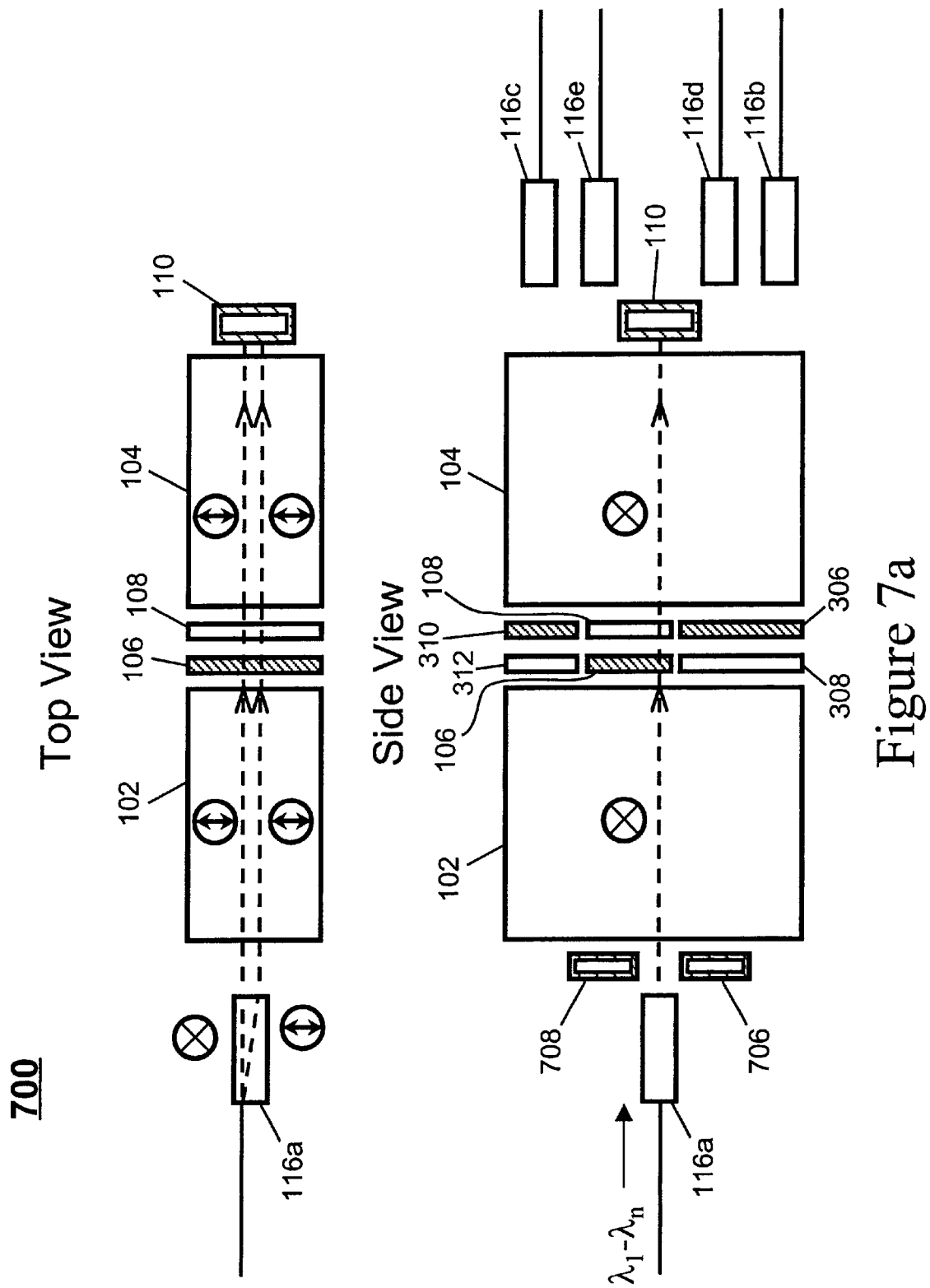
Figure 7C:
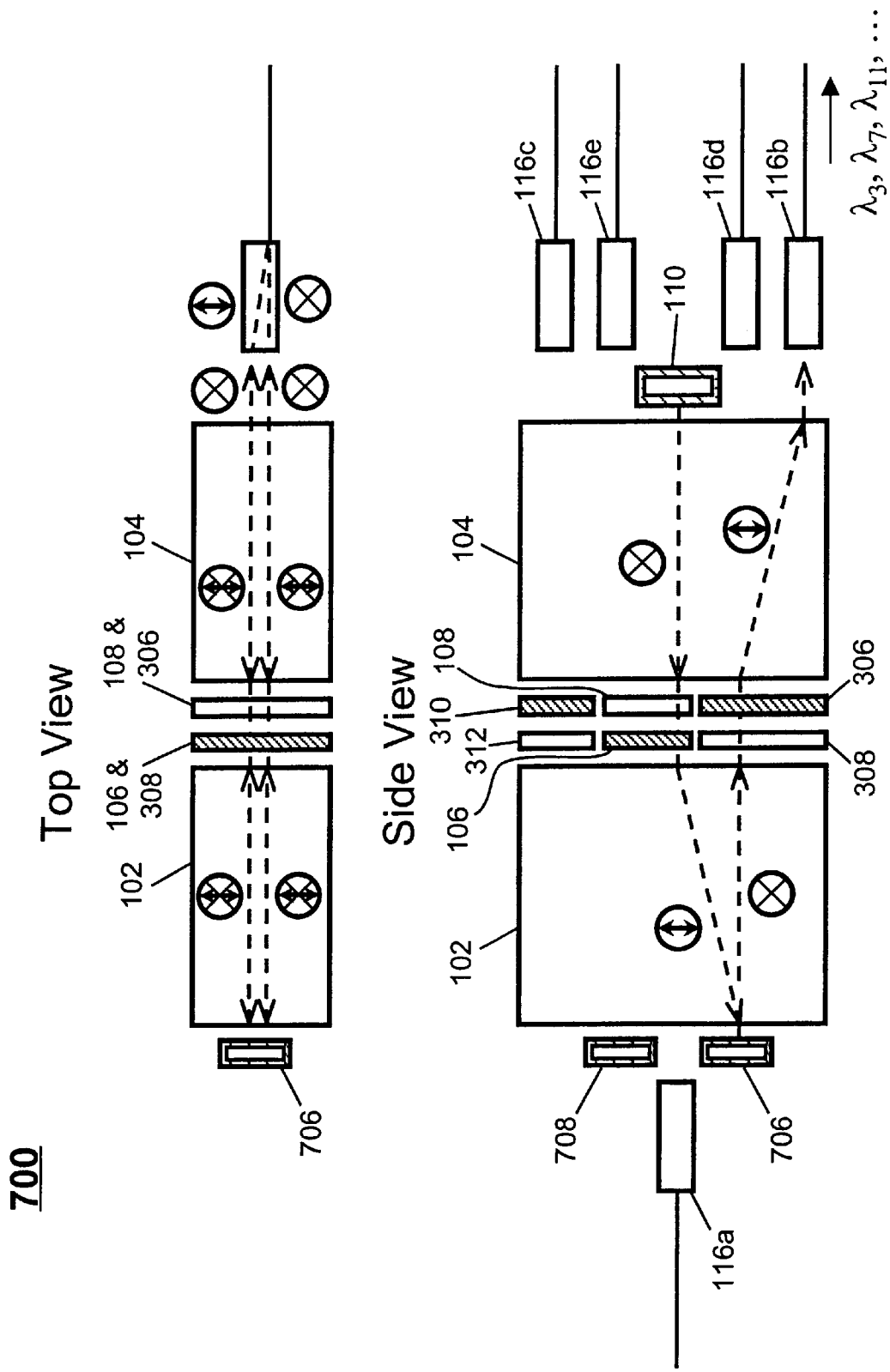

FIGS. 7b–7c illustrate the pathways of the odd channels $\lambda_1$, $\lambda_3$, $\lambda_5$, . . . through the channel separator 700 after interaction with and reflection by the first non-linear interferometer 110 and also illustrate the subsequent division of the odd channels into a first subset $\lambda_1$, $\lambda_5$, $\lambda_9$, . . . of the odd channels (FIG. 7b) and a second subset $\lambda_3$, $\lambda_7$, $\lambda_{11}$, . . . of the odd channels (FIG. 7c). The pathways of the odd channels $\lambda_1$, $\lambda_3$, $\lambda_5$, . . . from the first non-linear interferometer 110 to and through the birefringent plate 102 comprise a portion of the first channel separation stage and are similar to those illustrated for separator 300 in FIG. 3b. These pathways are therefore not re-described. As shown in both FIG. 7b and FIG. 7c, after exiting from the birefringent plate 102, the odd channels are vertically polarized and then are reflected by the second non-linear interferometer 706.

The second non-linear interferometer 706 has the property of reflecting the linearly polarized light of the odd channels input thereto such that the first subset of odd channels $\lambda_1$, $\lambda_5$, $\lambda_9$, . . . is reflected without polarization plane rotation (FIG. 7b) whilst the second subset of odd channels $\lambda_3$, $\lambda_7$, $\lambda_{11}$, . . . is reflected with a 90° polarization-plane rotation (FIG. 7c). Therefore, upon reflection from the second non-linear interferometer 706, the first subset $\lambda_1$, $\lambda_5$, $\lambda_9$, . . . of odd channels remains vertically polarized and thus passes back through birefringent plate 102 as a deflected e-ray. This first subset of odd channels then passes through birefringent plate 102 towards and through the first non-reciprocal optical rotator 106 and the first reciprocal optical rotator 108 (FIG. 7b). Simultaneously, the second subset $\lambda_3$, $\lambda_7$, $\lambda_{11}$, . . . of odd channels is reflected from the second non-linear interferometer 706 with horizontal polarization and thus passes back through birefringent plate 102 as an o-ray (FIG. 7c). This second subset of odd channels then passes un-deflected through birefringent plate 102 towards and through the second reciprocal optical rotator 308 and the second non-reciprocal optical rotator 306 (FIG. 7c).

Because the first subset of odd channels $\lambda_1$, $\lambda_5$, $\lambda_9$, . . . passes through the pair of rotators 106–108 from left to right, the light of these channels remains as a vertically polarized e-ray within the birefringent plate 104 and therefore is deflected within the birefringent plate 104 towards and into the output port 116d (FIG. 7b). Because the second subset of odd channels $\lambda_3$, $\lambda_7$, $\lambda_{11}$, . . . passes through the pair of rotators 308–306 from left to right, there is a net rotation of the polarization of the light of these channels so that these channels pass through the birefringent plate 104 as a vertically polarized e-ray (FIG. 7c). The light of this second subset of odd channels is therefore deflected within the birefringent plate 104 towards and into the output port 116b (FIG. 7c). In this fashion, the outputs of the first and second subsets of odd channels are separated from one another as well as from those of the even channels.

Figure 7D:
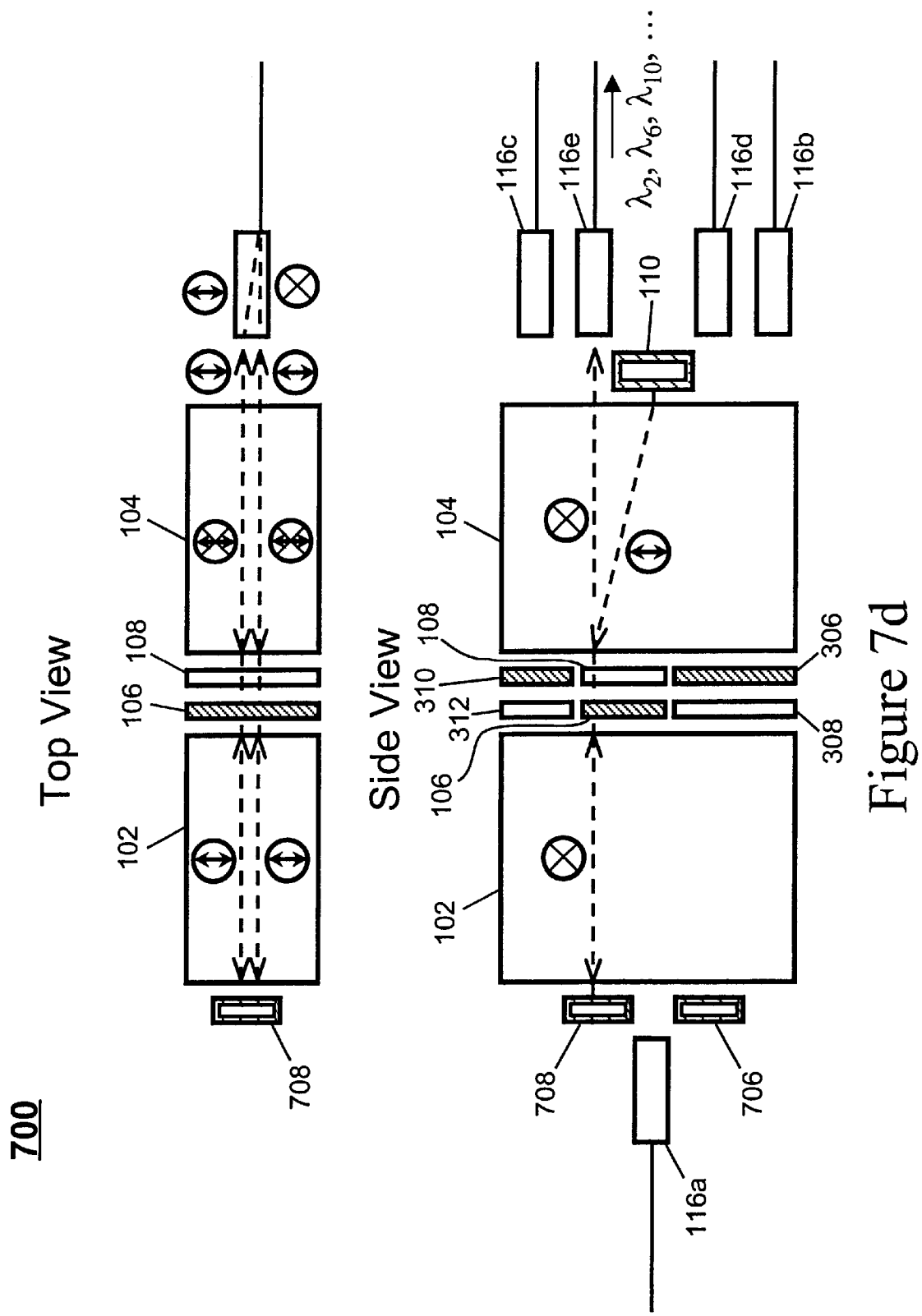
Figure 7E:
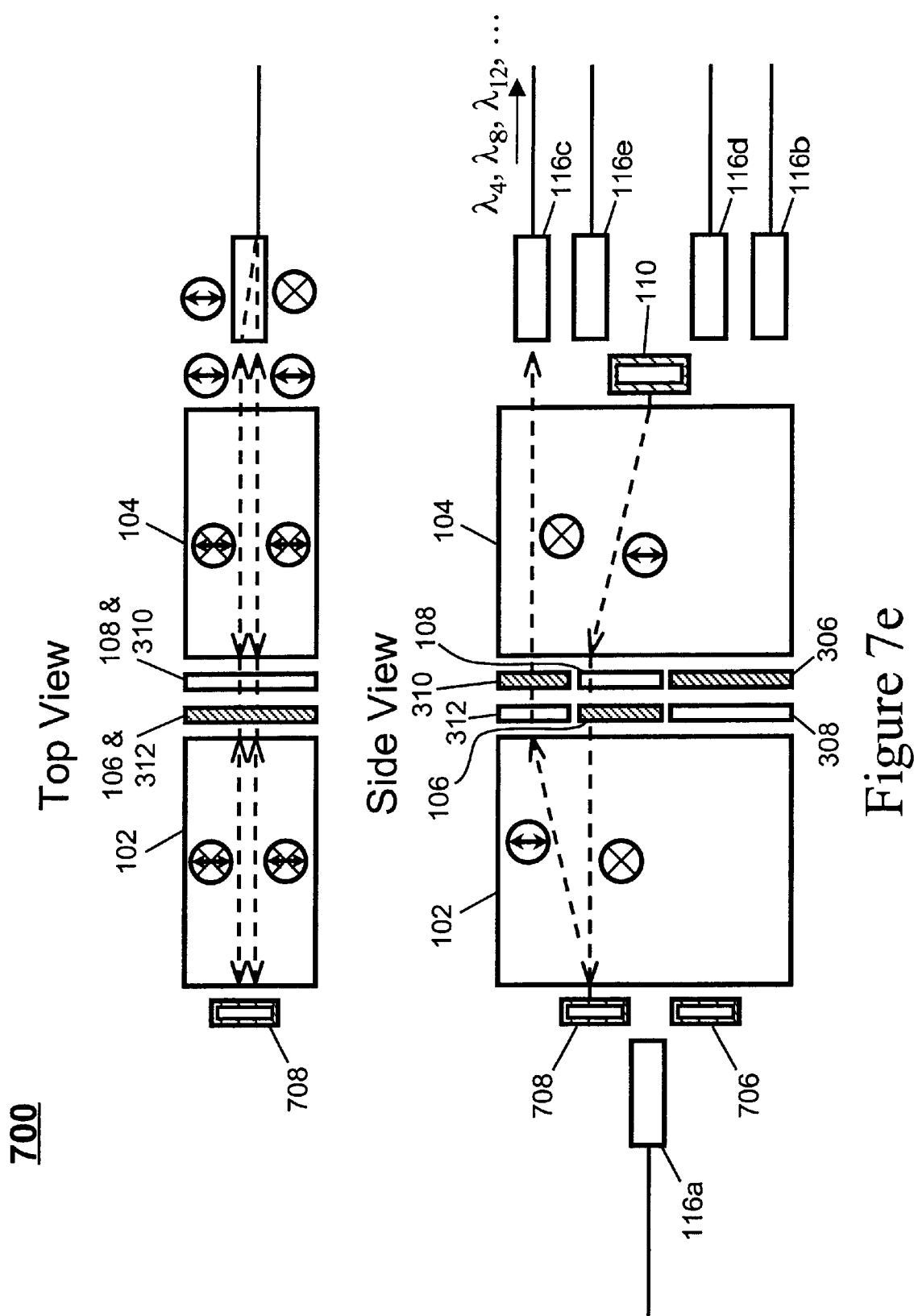

FIGS. 7d–7e illustrate the pathways of the even channels $\lambda_2$, $\lambda_4$, $\lambda_6$, . . . through the channel separator 700 after interaction with and reflection by the first non-linear interferometer 10. FIGS. 7d–7e also illustrate the subsequent division of the even channels into a first subset $\lambda_2$, $\lambda_6$, $\lambda_{10}$, . . . of the even channels and a second subset $\lambda_4$, $\lambda_8$, $\lambda_{12}$, . . . of the even channels, respectively. The pathways of the even channels from the first non-linear interferometer 110 to and through the birefringent plate 102 comprise a portion of the first channel separation stage and are similar to those illustrated for separator 300 in FIG. 3c. These pathways are therefore not re-described. As shown in both FIG. 7d and FIG. 7e, after exiting the birefringent plate 102, the even channels are horizontally polarized and then are reflected by the third non-linear interferometer 708.

The third non-linear interferometer 708 has the property of reflecting the linearly polarized light of the even channels input thereto such that the first subset of even channels $\lambda_2$, $\lambda_6$, $\lambda_{10}$, . . . is reflected without polarization plane rotation (FIG. 7d) whilst the second subset of even channels $\lambda_4$, $\lambda_8$, $\lambda_{12}$, . . . is reflected with a 90° polarization-plane rotation (FIG. 7e). Therefore, upon reflection from third non-linear interferometer 708, the first subset $\lambda_2$, $\lambda_6$, $\lambda_{10}$, . . . of even channels remains horizontally polarized and thus passes back through birefringent plate 102 as an un-deflected o-ray (FIG. 7d). This first subset of even channels then passes through birefringent plate 102 towards and through the first non-reciprocal optical rotator 106 and the first reciprocal optical rotator 108 (FIG. 7d). Simultaneously, the second subset $\lambda_4$, $\lambda_8$, $\lambda_{12}$, . . . of even channels is reflected from the third non-linear interferometer 708 with vertical polarization and thus passes back through birefringent plate 102 as a deflected e-ray (FIG. 7e). This second subset of even channels then passes through birefringent plate 102 towards and through the third reciprocal optical rotator 312 and the third non-reciprocal optical rotator 310 (FIG. 7e).

Because the first subset of even channels $\lambda_2, \lambda_6, \lambda_{10}, \ldots$ passes through the pair of rotators 106–108 from left to right, the light of these channels remains as a horizontally polarized o-ray within the birefringent plate 104 and therefore passes un-deflected through the birefringent plate 104 towards and into the output port 116e (FIG. 7d). Because the second subset of even channels $\lambda_4, \lambda_8, \lambda_{12}, \ldots$ passes through the pair of rotators 312–310 from left to right, there is a net rotation of the polarization of the light of these channels so that these channels pass through the birefringent plate 104 as a horizontally polarized o-ray (FIG. 7e). The light of this second subset of even channels therefore passes un-deflected through the birefringent plate 104 towards and into the output port 116c (FIG. 7e). In this fashion, the outputs of the first and second subsets of even channels are separated from one another as well as from those of the odd channels. From the foregoing discussions, it is apparent that the separator 700 receives, from a first port, a wavelength division multiplexed light comprised of a plurality of n channels $\lambda_1-\lambda_n$ and separates the plurality into four subsets of channels, each of which subsets are output from a respective one of a set of four output ports. In this fashion, the separator 700 functions as a 1×4 de-multiplexer.

Figure 8:
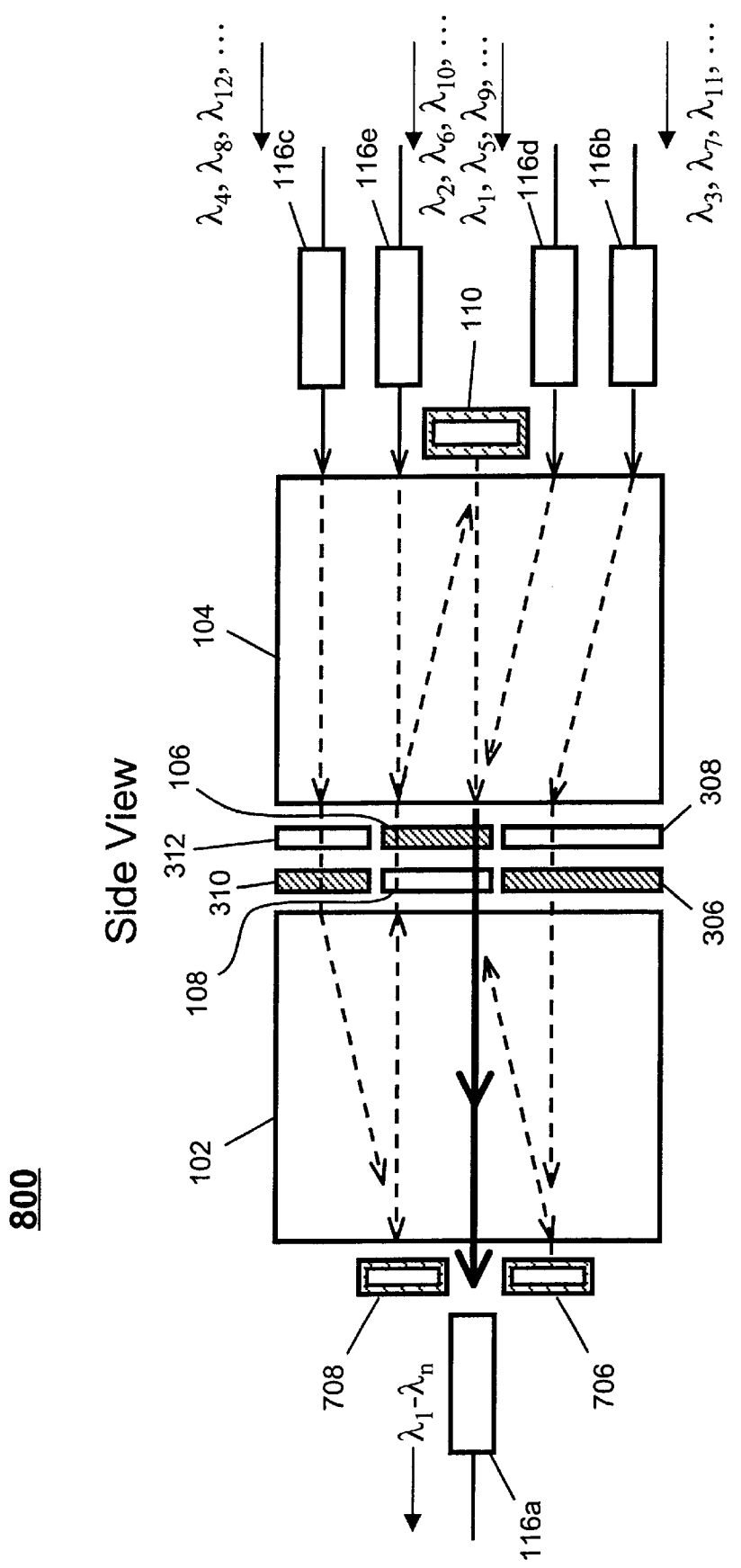
FIG. 8 illustrates a ninth preferred embodiment of the separator in accordance with the present invention.

Finally, FIG. 8 illustrates a ninth preferred embodiment of the separator in accordance with the present invention. The ninth preferred embodiment functions as a 4×1 dense wavelength division multiplexer. The 4×1 multiplexer 800 (FIG. 8) is identical in construction to the 1×4 de-multiplexer 700 (FIGS. 7a–7e) except that, as previously described in reference to the multiplexer 400, each adjacent pair of optical rotators functions in the reverse sense from the corresponding pair of rotators in the de-multiplexer 700. Therefore, in the multiplexer 800 (FIG. 8), the pathways of signal light rays are exactly reversed from those in the de-multiplexer 700 (FIGS. 7a–7e). As shown in FIG. 8, in the multiplexer 800, the channels $\lambda_3, \lambda_7, \lambda_{11}, \ldots$ input from port 116b are combined together with the channels $\lambda_4, \lambda_8, \lambda_{12}, \ldots$ input from port 116c, the channels $\lambda_1, \lambda_5, \lambda_9, \ldots$ input from port 116d and the channels $\lambda_2, \lambda_6, \lambda_{10}, \ldots$ input from port 116e such that the combined channels are all output from the port 116a.

An apparatus capable of functioning as a dense wavelength division de-multiplexer or multiplexer has been disclosed. In an exemplary embodiment, the channel separator of the present invention comprises a polarizing input port, two polarizing output ports, two birefringent plates, a reflective non-linear interferometer and a pair of optical rotators—one non-reciprocal and one reciprocal optical rotator—both interposed between the birefringent plates. Each of the polarizing input and polarizing output ports comprises an optical fiber, a collimator, a birefringent walk-off plate and a non-reciprocal optical rotator.

Further embodiments of the present invention provide additional optical isolation, optical circulation, optical comb filtering and/or two-stage channel separation capabilities. Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical device, comprising:
   a first birefringent plate;
   a first set of optical rotators optically coupled to the first birefringent plate, the first set of optical rotators comprising a first non-reciprocal optical rotator (NRR) and a first reciprocal optical rotator (RR);
   a second birefringent plate optically coupled to the first set of optical rotators at a side opposite to the first birefringent plate; and
   a first non-linear interferometer (NLI) optically coupled to the second birefringent plate at a side opposite to the first set of optical rotators, said first NLI comprising a waveplate disposed between two reflective surfaces.

2. The device of claim 1, further comprising:
   a plurality of optical ports.

3. The device of claim 2, wherein each of the plurality of ports comprise:
   an optical collimator;
   a birefringent walk-off plate optically coupled to the optical collimator; and
   an input reciprocal optical rotator intercepting a portion of a light from the birefringent walk-off plate.

4. The device of claim 1, wherein the first NRR is optically coupled to the first birefringent plate, and the first RR is optically coupled to the first NRR at a side opposite to the first birefringent plate.

5. The device of claim 1, wherein the first RR is optically coupled to the first birefringent plate, and the first NRR is optically coupled to the first RR at a side opposite to the first birefringent plate.

6. The device of claim 1, further comprising:
   a reflector optically coupled to the second birefringent plate at a side opposite to the first set of optical rotators; and
   a polarization beam splitter optically coupled to the second birefringent plate at a side opposite to the first set of optical rotators.

7. The device of claim 1, further comprising:
   a second set of optical rotators optically coupled to the second birefringent plate at a side opposite to the first NLI, the second set of optical rotators comprising a second NRR and a second RR;
   a third set of optical rotators optically coupled to the second birefringent plate at a side opposite to the first NLI, the third set of optical rotators comprising a third NRR and a third RR;
   a second NLI optically coupled to the first birefringent plate at a side opposite to the first set of optical rotators; and
   a third NLI optically coupled to the first birefringent plate at a side opposite to the first set of optical rotators.

8. The device of claim 7, wherein the second NLI and the third NLI each has a periodicity twice that of the first NLI.

9. The device of claim 7, wherein the first NRR is optically coupled to the first birefringent plate,
   wherein the first RR is optically coupled to the first NRR at a side opposite to the first birefringent plate,
   wherein the second RR is optically coupled to the first birefringent plate,
   wherein the second NRR is optically coupled to the second RR at a side opposite to the first birefringent plate, wherein the third RR is optically coupled to the first birefringent plate, wherein the third NRR is optically coupled to the third RR at a side opposite to the first birefringent plate.

10. The device of claim 7, wherein the first RR is optically coupled to the first birefringent plate, wherein the first NRR is optically coupled to the first RR at a side opposite to the first birefringent plate, wherein the second NRR is optically coupled to the first birefringent plate, wherein the second RR is optically coupled to the second NRR at a side opposite to the first birefringent plate, wherein the third NRR is optically coupled to the first birefringent plate, wherein the third RR is optically coupled to the third NRR at a side opposite to the first birefringent plate.

11. The device of claim 1, further comprising:

a first reflector optically coupled to the first birefringent plate at a side opposite to the first set of optical rotators; and a polarization rotating reflector optically coupled to the first birefringent plate at a side opposite to the first set of optical rotators.

12. The device of claim 11, wherein the polarization rotating reflector comprises:

a quarter-wavelength plate; and a mirror coupled to the quarter-wavelength plate.

13. The device of claim 11, further comprising:

a second reflector optically coupled to the second birefringent plate at a side opposite to the first set of optical rotators; and a polarization beam splitter optically coupled to the second birefringent plate at a side opposite to the first set of optical rotators.

14. A device functioning as a demultiplexer (DEMUX) and an optical isolator, comprising:

a first birefringent plate;

a non-reciprocal rotator (NRR) optically coupled to the first birefringent plate;

a reciprocal rotator (RR) optically coupled to the NRR at a side opposite to the first birefringent plate;

a second birefringent plate optically coupled to the RR at a side opposite to the NRR; and a non-linear interferometer (NLI) optically coupled to the second birefringent plate at a side opposite to the RR, said NLI comprising a waveplate disposed between two reflective surfaces.

15. A device functioning as a multiplexer (MUX) and an optical isolator, comprising:

a first birefringent plate;

a reciprocal rotator (RR) optically coupled to the first birefringent plate;

a non-reciprocal rotator NRR optically coupled to the RR at a side opposite to the first birefringent plate;

a second birefringent plate optically coupled to the NRR at a side opposite to the RR; and a non-linear interferometer (NLI) optically coupled to the second birefringent plate at a side opposite to the RR, said NLI comprising a waveplate disposed between two reflective surfaces.

16. A device functioning as a DEMUX and an optical circulator, comprising:

a first birefringent plate;

a set of optical rotators optically coupled to the first birefringent plate, the set of optical rotators comprising a non-reciprocal rotator (NRR) and a reciprocal rotator (RR);

a second birefringent plate optically coupled to the set of optical rotators at a side opposite to the first birefringent plate;

a non-linear interferometer (NLI) optically coupled to the second birefringent plate at a side opposite to the set of optical rotators, said NLI comprising a waveplate disposed between two reflective surfaces;

a reflector optically coupled to the second birefringent plate at a side opposite to the set of optical rotators; and a polarization beam splitter optically coupled to the second birefringent plate at a side opposite to the set of optical rotators.

17. An optical device, comprising:

a first birefringent plate;

a first set of optical rotators optically coupled to the first birefringent plate, the first set of optical rotators comprising a first non-reciprocal rotator (NRR) and a first reciprocal rotator (RR);

a second birefringent plate optically coupled to the first set of optical rotators at a side opposite to the first birefringent plate;

a first non-linear interferometer (NLI) optically coupled to the second birefringent plate at a side opposite to the first set of optical rotators, said NLI comprising a waveplate disposed between two reflective surfaces;

a second set of optical rotators optically coupled to the second birefringent plate at a side opposite to the first NLI, the second set of optical rotators comprising a second NRR and a second RR;

a third set of optical rotators optically coupled to the second birefringent plate at a side opposite to the first NLI, the third set of optical rotators comprising a third NRR and a third RR;

a second NLI optically coupled to the first birefringent plate at a side opposite to the first set of optical rotators; and a third NLI optically coupled to the first birefringent plate at a side opposite to the first set of optical rotators.

18. A device functioning as a DEMUX, a comb filter, and an optical isolator, comprising:

a first birefringent plate;

a first non-reciprocal rotator (NRR) optically coupled to the first birefringent plate;

a first reciprocal rotator (RR) optically coupled to the first NRR at a side opposite to the first birefringent plate;

a second birefringent plate optically coupled to the first RR at a side opposite to the first NRR;

a first non-linear interferometer (NLI) optically coupled to the second birefringent plate at a side opposite to the first RR, said first NLI comprising a waveplate disposed between two reflective surfaces;

a second RR optically coupled to the first birefringent plate;

a second NRR optically coupled to the second RR at a side opposite to the first birefringent plate;

a third RR optically coupled to the first birefringent plate;

a third NRR optically coupled to the third RR at a side opposite to the first birefringent plate;

a second NLI optically coupled to the first birefringent plate at a side opposite to the second RR; and a third NLI optically coupled to the first birefringent plate at a side opposite to the third RR.

19. A device functioning as a MUX, a comb filter, and an optical isolator, comprising:
a first birefringent plate;
a first reciprocal rotator (RR) optically coupled to the first birefringent plate;
a first non-reciprocal rotator (NRR) optically coupled to the first RR at a side opposite to the first birefringent plate;
a second birefringent plate optically coupled to the first NRR at a side opposite to the first RR;
a first non-linear interferometer (NLI) optically coupled to the second birefringent plate at a side opposite to the first NRR, said first NLI comprising a waveplate disposed two reflective surfaces;
a second NRR optically coupled to the first birefringent plate;
a second RR optically coupled to the second NRR at a side opposite to the first birefringent plate;
a third NRR optically coupled to the first birefringent plate;
a third RR optically coupled to the third NRR at a side opposite to the first birefringent plate;
a second NLI optically coupled to the first birefringent plate at a side opposite to the second NRR; and
a third NLI optically coupled to the first birefringent plate at a side opposite to the third NRR.

20. A device functioning as a DEMUX, a comb filter, and an optical isolator, comprising:
a first birefringent plate;
a set of optical rotators optically coupled to the first birefringent plate, the set of optical rotators comprising a non-reciprocal rotator (NRR) and a reciprocal rotator (RR);
a second birefringent plate optically coupled to the set of optical rotators at a side opposite to the first birefringent plate;
a non-linear interferometer (NLI) optically coupled to the second birefringent plate at a side opposite to the set of optical rotators, said NLI comprising a waveplate disposed between two reflective surfaces;
a reflector optically coupled to the first birefringent plate at a side opposite to the set of optical rotators; and
a polarization rotating reflector optically coupled to the first birefringent plate at a side opposite to the set of optical rotators.

21. A device functioning as a DEMUX, a comb filter, and an optical circulator, comprising:
a first birefringent plate;
a set of optical rotators optically coupled to the first birefringent plate, the set of optical rotators comprising a non-reciprocal (NRR) and a reciprocal rotator (RR);
a second birefringent plate optically coupled to the set of optical rotators at a side opposite to the first birefringent plate;
a non-linear interferometer (NLI) optically coupled to the second birefringent plate at a side opposite to the set of optical rotators, said NLI comprising a waveplate disposed between two reflective surfaces;
a first reflector optically coupled to the first birefringent plate at a side opposite to the set of optical rotators;
a polarization rotating reflector optically coupled to the first birefringent plate at a side opposite to the set of optical rotators;

a second reflector optically coupled to the second birefringent plate at a side opposite to the set of optical rotators; and
a polarization beam splitter optically coupled to the second birefringent plate at a side opposite to the set of optical rotators.

22. An optical device, comprising:
a first birefringent plate;
a first set of optical rotators optically coupled to the first birefringent plate, the first set of optical rotators comprising a first non-reciprocal (NRR) and a first reciprocal rotator (RR);
a second birefringent plate optically coupled to the first set of optical rotators at a side opposite to the first birefringent plate;
a first non-linear interferometer optically coupled to the second birefringent plate at a side opposite to the first set of optical rotators, said first NLI comprising a waveplate disposed between two reflective surfaces;
a second set of optical rotators optically coupled to the second birefringent plate at a side opposite to the first NLI, the second set of optical rotators comprising a second NRR and a second RR;
a third set of optical rotators optically coupled to the second birefringent plate at a side opposite to the first NLI, the third set of optical rotators comprising a third NRR and a third RR;
a second NLI optically coupled to the first birefringent plate at a side opposite to the second set of optical rotators, wherein the second NLI has a periodicity twice that of the first NLI; and
a third NLI optically coupled to the first birefringent plate at a side opposite to the third set of optical rotators, wherein the third NLI has a periodicity twice that of the first NLI.

23. A device functioning as a DEMUX, comprising:
a first birefringent plate;
a first non-reciprocal rotator (NRR) optically coupled to the first birefringent plate;
a first reciprocal rotator (RR) optically coupled to the first NRR at a side opposite to the first birefringent plate;
a second birefringent plate optically coupled to the first RR at a side opposite to the first NRR;
a first non-linear interferometer (NLI) optically coupled to the second birefringent plate at a side opposite to the first RR, said first NLI comprising a waveplate disposed between two reflective surfaces;
a second RR optically coupled to the first birefringent plate;
a second NRR optically coupled to the second RR at a side opposite to the first birefringent plate;
a third RR optically coupled to the first birefringent plate;
a third NRR optically coupled to the second RR at a side opposite to the first birefringent plate;
a second NLI optically coupled to the first birefringent plate at a side opposite to the second RR, wherein the second NLI has a periodicity twice that of the first NLI; and
a third NLI optically coupled to the first birefringent plate at a side opposite to the third RR, wherein the third NLI has a periodicity twice that of the first NLI.

24. A device functioning as a MUX, comprising:
a first birefringent plate;

a first reciprocal rotator (RR) optically coupled to the first birefringent plate;
a first non-reciprocal rotator (NRR) optically coupled to the first RR at a side opposite to the first birefringent plate;
a second birefringent plate optically coupled to the first NRR at a side opposite to the first RR;
a first non-linear interferometer (NLI) optically coupled to the second birefringent plate at a side opposite to the first NRR, said first NLI comprising a waveplate disposed between two reflective surfaces;
a second NRR optically coupled to the first birefringent plate;
a second RR optically coupled to the second NRR at a side opposite to the first birefringent plate;
a third NRR optically coupled to the first birefringent plate;
a third RR optically coupled to the third NRR at a side opposite to the first birefringent plate;
a second NLI optically coupled to the first birefringent plate at a side opposite to the second NRR, wherein the second NLI has a periodicity twice that of the first NLI; and
a third NLI optically coupled to the first birefringent plate at a side opposite to the third NRR, wherein the third NLI has a periodicity twice that of the first NLI.

25. A system, comprising:
an optical network, the optical network comprising a composite optical signal; and
an optical device, the optical device comprising:
  a first birefringent plate,
  a set of optical rotators optically coupled to the first birefringent plate, the set of optical rotators comprising a non-reciprocal rotator (NRR) and a reciprocal rotator (RR),
  a second birefringent plate optically coupled to the set of optical rotators at a side opposite to the first birefringent plate, and
  a non-linear interferometer (NLI) optically coupled to the second birefringent plate at a side opposite to the set of optical rotators, said NLI comprising a waveplate disposed between two reflective surfaces.

26. A system, comprising:
an optical network, the optical network comprising a composite optical signal; and
a DEMUX for separating the composite optical signal into a plurality of channels, the DEMUX comprising:
  a first birefringent plate,
  a non-reciprocal rotator (NRR) optically coupled to the first birefringent plate;
  a reciprocal rotator (RR) optically coupled to the NRR at a side opposite to the first birefringent plate,
  a second birefringent plate optically coupled to the RR at a side opposite to the NRR, and
  a non-linear interferometer (NLI) optically coupled to the second birefringent plate at a side opposite to the RR, said NLI comprising a waveplate disposed between two reflective surfaces.

27. A system, comprising:
an optical network, the optical network comprising a composite optical signal; and
a MUX for combining the plurality of channels into a composite optical signal comprising:
  a first birefringent plate,
  a reciprocal rotator (RR) optically coupled to the first birefringent plate,
  a non-reciprocal rotator (NRR) optically coupled to the RR at a side opposite to the first birefringent plate,
  a second birefringent plate optically coupled to the NRR at a side opposite to the RR; and
  a non-linear interferometer (NLI) optically coupled to the second birefringent plate at a side opposite to the NRR, said NLI comprising a waveplate disposed between two reflective surfaces.

28. A method for demultiplexing a composite optical signal, the composite optical signal comprising a first channel with a polarization plane with a first orientation and a second channel with a polarization plane with a first orientation, comprising the steps of:
  (a) transmitting the composite optical signal;
  (b) reflecting the composite optical signal from a non-linear interferometer, wherein the non-linear interferometer rotates a polarization plane of the second channel to a second orientation, said non-linear interferometer comprising a waveplate disposed between two reflective surfaces.
  (c) rotating the polarization plane of the first channel to the second orientation and the polarization plane of the second channel to the first orientation; and
  (d) deflecting the first channel to a first port and the second channel to a second port.

29. A method for multiplexing a plurality of channels, comprising the steps of:
  (a) transmitting a first channel with a polarization plane with a first orientation and a second channel with a polarization plane with a second orientation;
  (b) rotating the polarization plane of the first channel to the second orientation and the polarization plane of the second channel to the first orientation;
  (c) reflecting the first and second channel from a non-linear interferometer, wherein the non-linear interferometer rotates a polarization plane of the first channel to a first orientation, said non-linear interferometer comprising a waveplate disposed between two reflective surfaces; and
  (d) transmitting the first and second channels as a composite optical signal to an optical port.

30. A system, comprising:
an optical network comprising a DEMUX; and
a composite optical signal comprising a first channel with a polarization plane with a first orientation and a second channel with a polarization plane with a first orientation, the composite optical signal traversing through the DEMUX,
wherein the composite optical signal is transmitted,
wherein the composite optical signal is reflected from a non-linear interferometer, wherein the non-linear interferometer rotates a polarization plane of the second channel to a second orientation, said non-linear interferometer comprising a waveplate disposed between two reflective surfaces,
wherein the polarization plane of the first channel is rotated to the second orientation and the polarization plane of the second channel is rotated to the first orientation, and
wherein the first channel is deflected to a first port and the second channel is deflected to a second port.

31. A system, comprising:
an optical network comprising a MUX; and a plurality of channels, the plurality of channels traversing through the MUX, wherein a first channel is transmitted with a polarization plane with a first orientation and a second channel is transmitted with a polarization plane with a second orientation, wherein the polarization plane of the first channel is rotated to the second orientation and the polarization plane of the second channel is rotated to the first orientation, wherein the first and second channels are reflected from a non-linear interferometer, wherein the non-linear interferometer rotates a polarization plane of the first channel to a first orientation, said non-linear interferometer comprising a waveplate disposed between two reflective surfaces, and wherein the first and second channels are transmitted as a composite optical signal to an optical port.

32. A system for demultiplexing a composite optical signal, the composite optical signal comprising a first channel and a second channel, comprising:

means for transmitting the composite optical signal;

means for reflecting the composite optical signal from a non-linear interferometer, wherein the non-linear interferometer rotates a polarization plane of the second channel from a first orientation to a second orientation, said non-linear interferometer comprising a waveplate disposed between two reflective surfaces;

means for rotating the polarization plane of the first channel to the second orientation and the polarization plane of the second channel to the first orientation; and means for deflecting the first channel to a first port and the second channel to a second port.

33. A system for multiplexing a plurality of channels, comprising:

means for transmitting a first channel with a polarization plane with a first orientation and a second channel with a polarization plane with a second orientation;

means for rotating the polarization plane of the first channel to the second orientation and the polarization plane of the second channel to the first orientation;

means for reflecting the first and second channels from a non-linear interferometer, wherein the non-linear interferometer rotates a polarization plane of the first channel to a first orientation, said non-linear interferometer comprising a waveplate disposed between two reflective surfaces; and means for transmitting the first and second channels as a composite optical signal to an optical port.

* * * * *